US012570563B2

(12) United States Patent
Seo et al.

(10) Patent No.: US 12,570,563 B2
(45) Date of Patent: Mar. 10, 2026

(54) METHOD AND SYSTEM FOR CONTROLLING A TIN BATH ATMOSPHERE FOR THE REDUCTION OF SURFACE DEFECTS

(71) Applicant: Air Products and Chemicals, Inc., Allentown, PA (US)

(72) Inventors: Eric R. Seo, Bowmanstown, PA (US); Liang He, Allentown, PA (US); Reed Jacob Hendershot, Mesa, AZ (US); Michael J. Gallagher, Coopersburg, PA (US); Ranajit Ghosh, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 226 days.

(21) Appl. No.: 18/214,697

(22) Filed: Jun. 27, 2023

(65) Prior Publication Data

US 2024/0109802 A1 Apr. 4, 2024

Related U.S. Application Data

(60) Provisional application No. 63/412,937, filed on Oct. 4, 2022.

(51) Int. Cl.
*C03B 18/20* (2006.01)
*C03B 18/22* (2006.01)

(52) U.S. Cl.
CPC .............. *C03B 18/20* (2013.01); *C03B 18/22* (2013.01)

(58) Field of Classification Search
CPC ............................... C03B 18/20; C03B 18/22
See application file for complete search history.

(56) References Cited

U.S. PATENT DOCUMENTS

| 3,976,460 A | 8/1976 | Kompare et al. |
| 5,057,133 A | 10/1991 | Chen et al. |
| | (Continued) | |

FOREIGN PATENT DOCUMENTS

| CN | 105967504 | 9/2016 |
| CN | 106977080 | 7/2017 |
| | (Continued) | |

OTHER PUBLICATIONS

Translation of CN 105967504 (Year: 2016).*

(Continued)

*Primary Examiner* — Cynthia Szewczyk
(74) *Attorney, Agent, or Firm* — Jason M. Ploeger

(57) ABSTRACT

A controller, process, and glass manufacturing apparatus can be configured to minimize defects. Embodiments can be adapted to control injection of nitrogen and/or argon and a mixture of nitrogen and hydrogen or nitrogen, hydrogen, and argon during glass float manufacturing to facilitate a pre-selected hydrogen concentration within a tin bath furnace while also minimizing glass surface defects that can be caused from tin condensation and tin bath impurity concentrations. Empirical use data can also be collected and provided to a pre-defined machine learning element of a host device to update a pre-defined control scheme of a controller for adapting the operational condition set points or other target values to account for furnace operation history and performance.

9 Claims, 6 Drawing Sheets

(56) References Cited

U.S. PATENT DOCUMENTS

| | | | |
|---|---|---|---|
| 6,094,942 | A | 8/2000 | Falleroni et al. |
| 8,276,403 | B2 | 10/2012 | Nelson |
| 2007/0062218 | A1 | 3/2007 | Champinot et al. |
| 2022/0169549 | A1 | 6/2022 | Hendershot et al. |

FOREIGN PATENT DOCUMENTS

| | | | | |
|---|---|---|---|---|
| DE | 102007009495 A1 * | 8/2008 | ............ | C03B 18/16 |
| EP | 3617158 | 3/2020 | | |
| WO | 2008021023 | 2/2008 | | |
| WO | 2014125954 | 8/2014 | | |
| WO | WO-2020191275 A1 * | 9/2020 | ............ | C03B 18/22 |

OTHER PUBLICATIONS

Translation of DE 102007009495 (Year: 2008).*
Terutaka Maehara, et al., "Behaviour of oxygen in the tin bath used in float glass production", Glass Technol.: Eur. J. Glass Sci. Technol. A, Dec. 2012, 53 (6), 261-272.
Paul Laimbock, et al., "On-Line Oxygen Sensors For The Glass Melt And The Tin Bath And Modelling of Oxidation State Of Glass Melts", Advanced Materials Research, Apr. 2008, 1-19.

\* cited by examiner

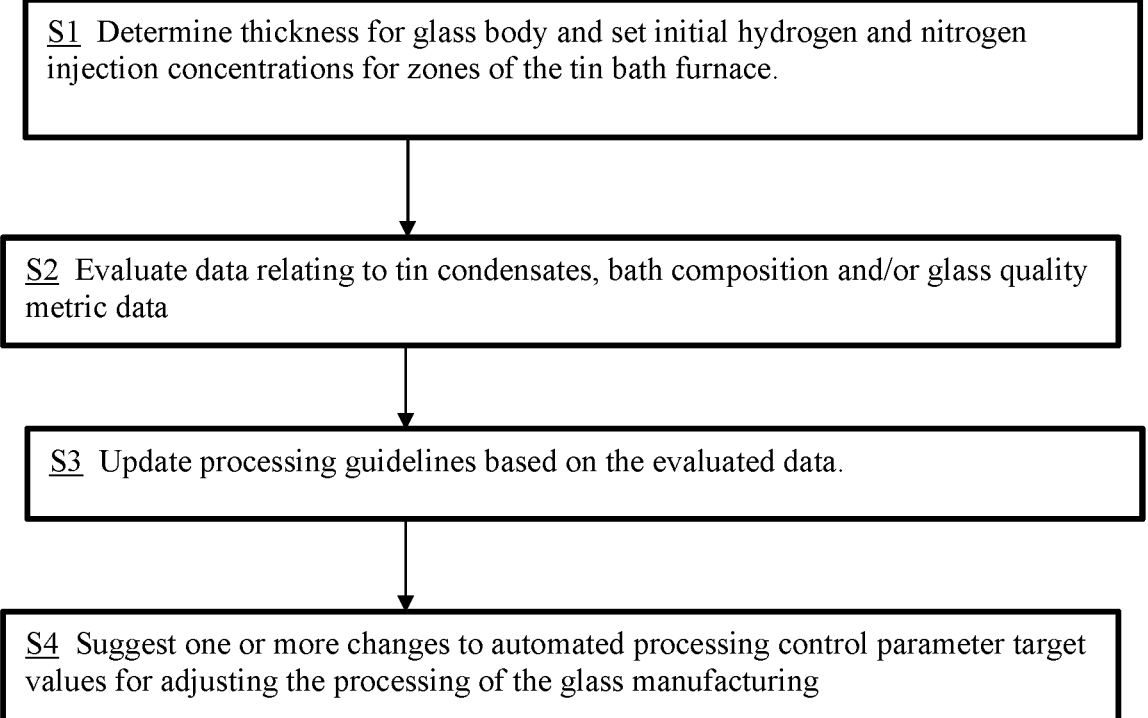

S1  Determine thickness for glass body and set initial hydrogen and nitrogen injection concentrations for zones of the tin bath furnace.

S2  Evaluate data relating to tin condensates, bath composition and/or glass quality metric data S3  Update processing guidelines based on the evaluated data.

S4  Suggest one or more changes to automated processing control parameter target values for adjusting the processing of the glass manufacturing

FIG. 4

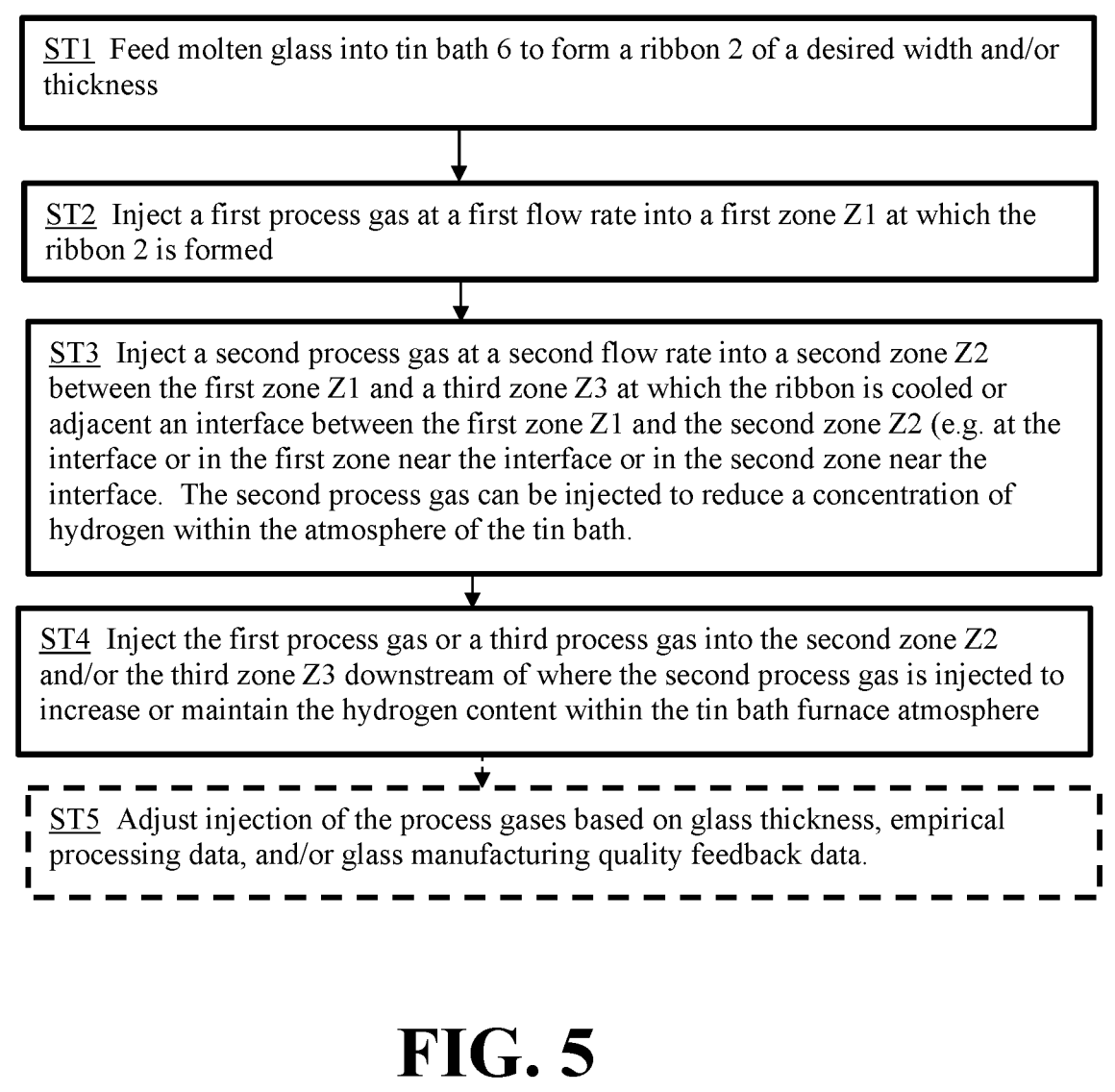

ST1  Feed molten glass into tin bath 6 to form a ribbon 2 of a desired width and/or thickness ST2  Inject a first process gas at a first flow rate into a first zone Z1 at which the ribbon 2 is formed ST3  Inject a second process gas at a second flow rate into a second zone Z2 between the first zone Z1 and a third zone Z3 at which the ribbon is cooled or adjacent an interface between the first zone Z1 and the second zone Z2 (e.g. at the interface or in the first zone near the interface or in the second zone near the interface.  The second process gas can be injected to reduce a concentration of hydrogen within the atmosphere of the tin bath.

ST4  Inject the first process gas or a third process gas into the second zone Z2 and/or the third zone Z3 downstream of where the second process gas is injected to increase or maintain the hydrogen content within the tin bath furnace atmosphere ST5  Adjust injection of the process gases based on glass thickness, empirical processing data, and/or glass manufacturing quality feedback data.

FIG. 5

METHOD AND SYSTEM FOR CONTROLLING A TIN BATH ATMOSPHERE FOR THE REDUCTION OF SURFACE DEFECTS

CROSS-REFERENCE TO RELATED APPLICATIONS

The present application claims priority to U.S. Provisional Patent Application No. 63/412,937 filed on Oct. 4, 2022.

FIELD

The present innovation relates to controllers that are configured to facilitate control of operations of tin bath float glass processing used to manufacture glass, glass manufacturing apparatuses, glass manufacturing control systems, and methods of making and using the same.

BACKGROUND

Examples of glass production can be appreciated from U.S. Patent Application Publication Nos. 2022/0169549, and U.S. Pat. No. 5,057,1335. In float glass production, molten glass can be fed onto a bath of molten tin for formation of the glass.

A major concern in glass production is surface defects. Surface defects may occur while the glass is being formed in a tin bath. Some examples of tin bath surface defects may be generalized as "Tin Drip", "Tin Drop", "Cassiterite Particles", "Top Tin", "Bottom Surface Tin", "Dross Formation", "Bloom Formation", and any other defect types associated with or originating in the tin bath environment. Defects impact the glass differently, but all defects reduce the quality and yield of glass production.

SUMMARY

We have determined that surface defect conditions can be avoided with an improved control scheme for float glass production processing. In some embodiments, the improved control scheme can include controlling an injection of process gas into a tin bath furnace of the float glass manufacturing that can provide improved control of reactant concentrations within the atmosphere of the tin bath furnace (e.g. concentrations of hydrogen) above the tin bath as well as maintaining impurity concentrations within the tin bath to at or below a pre-selected impurity level. Some embodiments can include use of process gas injection and control scheme in which an inert process gas (e.g. nitrogen gas, a mixture of nitrogen gas and argon gas, etc.) is injected between a formation phase and transition phase of the glass forming process while the glass is on a molten tin bath. The injection of the inert gas can be positioned between locations at which a process gas having a reactant (e.g. hydrogen gas) mixed with an inert gas (e.g. argon and/or nitrogen gas or just nitrogen gas) is injected upstream of the inert injection location and also downstream of the inert injection location to help maintain a more consistent and uniform concentration of the reactant (e.g. hydrogen) within the entirety of the tin bath atmosphere for the full processing of the glass manufacturing process. We have found that embodiments can provide a significant reduction in tin condensate formation that can facilitate reduced surface defects from tin condensate being formed on or adjacent a roof and dropping onto the glass as it is formed while also maintaining tin bath impurity levels to a desired level to help mitigate against bottom surface defects.

We have also found that embodiments can utilize an extraction system to help remove injected process gas from the atmosphere above the glass body positioned on a tin bath to help remove entrained particulates and process gas for particulate removal. The removed gas can undergo filtration via a mesh, cloth filter, or other filter media and be recycled back to the tin bath furnace. The removal of the particulates can help clean the atmosphere above the glass body during glass manufacturing to facilitate a reduction in defects that may be caused by such particulate material and any reactions that particulate material could have that may contribute to defect formation. An example of such particulate material can be tin dioxide ($SnO_2$), which may be formed during the glass manufacturing process and be entrained in the hot gas above the glass body. In some situations, the removed process gas can be vented instead of recycled or some portion of the process gas that is extracted can be vented while another portion is recycled. The extent of recycling can be based on the concentration of a reactant within the extracted gas, the temperature of the extracted gas, and other factors.

Embodiments can also include (or alternatively include) roof heating element power adjustment. Power adjustment that can control the heating provided by tin bath furnace roof heating elements can be provided to increase heating provided to help purge condensates of tin or other impurity material that may be formed on the roof or on the heating elements. Such purging can occur at pre-selected cycles of operation (e.g. a purging time period) during which a lower quality glass may be made in which defects from such purging may not contribute to significant glass quality degradation. Such purging can be performed so that the tin bath furnace can be in a cleaner or less impurity concentration state for subsequent manufacture of higher quality glass having a higher quality threshold that requires a lower concentration of defects or a lower density of surface defects.

The power adjustment for the heating elements can also be provided (or alternatively be provided) so that different portions of the heating elements are operated at higher powers while others are operated at lower powers depending on the tin condensate concentration at those different locations. Locations having a higher tin condensate concentration can be controlled so that the heating elements operate at a lower power level to provide less heating to help minimize further tin condensate formation while other locations at which the tin condensate levels are lower can have their heaters operated at a higher power level so that the overall heating provided by all the heating elements is able to maintain a desired heating level while location control of the heating is able to be adjusted to minimize tin condensate formation on or adjacent the tin bath furnace roof heating elements. When some heating elements are operated at a lower power, venting or sweeping gas injection can be provided to help prevent tin condensate build-up. Such venting or sweeping can include an injection of process gas to pass along the low power heating elements to facilitate entrainment and removal of tin condensate for subsequent extraction and/or venting, for example.

Some embodiments can be configured to utilize a particulate monitoring apparatus that may utilize one or more sensors or other particulate monitoring devices to evaluate particulate build-up within the atmosphere above a glass body being formed on the tin bath. When the particulate levels are detected as being at a level that is above a first high threshold, the amount of reactant injected into the furnace atmosphere can be reduced to facilitate a reduction in particulate formation. Such a reduction can occur by reducing a flow rate of injected process gas including the reactant and/or reducing a concentration of the reactant into the process gas being injected for example. When the particulate levels are detected as being at or below a second low threshold, the amount of reactant injected into the furnace atmosphere can be increased to facilitate more efficient heating utilization and improving the impurity level within the tin bath. Such an increase can occur by increasing a flow rate of injected process gas including the reactant and/or increasing a concentration of the reactant into the process gas being injected for example.

We have surprisingly found that embodiments of our controller, glass manufacturing apparatus, and process have been able to significantly reduce surface defect formation. For example, we have found that some embodiments can reduce surface defect formation rates from a 35% reduction to a 5% reduction of surface defect formation. This type of reduction is substantial and can help avoid formation of waste glass that must be disposed of and/or recycled and improved energy utilization in the glass manufacturing process. For example, in a system design to form 700 tons of glass per day, the surface defect reduction may provide an overall economic value of up to $17,000 per month. These improvements avoid waste, and help improve environmental impacts associated with glass manufacturing, and also improve operational profitability. Further, embodiments can provide such improvement while being relatively inexpensive to implement. The relatively low capital and operational costs that can be incurred for implementation of embodiments can permit a high return on investment to help provide the above noted improvements.

As can be appreciated from the above and as discussed elsewhere herein, embodiments of methods, apparatuses, and systems may include but may not be limited to the following control processes and\or systems, either individually or in combination: (i) a control process by utilizing a correlation of defects to a control value of glass thickness to optimize process gas flow rates; (ii) a control process and system which utilizes locally controlled H2 injection, to target specific areas based on tin-oxygen levels and/or, target areas based on glass thickness; (iii) a control process and system to optimize tin bath furnace atmospheric flow distribution by utilizing an extraction system from the tin bath side wall; (iv) a control process which utilizes a correlation of defects to the roof-mounted candle heater power levels at each specific section; and (v) a control process which utilizes a purging of roof and heater candle condensates during glass thickness transitions.

As noted above, embodiments of the methods and systems disclosed herein may improve quality and yield of float glass by reducing surface defects produced in a tin bath environment by dynamically modifying the internal atmosphere and adjusting flow patterns inside the tin bath environment. The methods and systems disclosed herein may also improve and help maintain overall tin bath cleanliness by removing particulate and/or defect causing agents that may or may not be volatile.

In some embodiments, a glass thickness to defect correlation and section specific targeting for process gas control can be employed. The process gas to be controlled can include nitrogen ($N_2$) gas, hydrogen ($H_2$) and a combination of nitrogen and hydrogen ($N_2/H_2$) gas. Particulate and/or gas removal devices and/or mechanism can be utilized in some embodiments via an extraction system positioned adjacent at least one tin bath side wall. Particulates and/or gas that is extracted can be processed to remove particulates and vent and/or recycle the extracted gas. Embodiments can also utilize internal purging of tin bath furnace roof components.

Embodiments of methods and apparatuses disclosed herein may also comprise correlating defects to a control value of glass thickness to optimize process gas flow rates. This may include but may not be limited to a linear correlation of glass thickness to process gas flow rates, $N_2/H_2$ mixture of gas. In some embodiments, the range end points of a process gas of $2\pm2\%$ $H_2$ for 2.2 mm glass thickness and a process gas of $6\pm2\%$ $H_2$ for 5.7 mm glass thickness, with end points of a process gas within the range of $2\pm1\%$ $H_2$ for 2.2 mm glass thickness and a process gas of $6\pm1\%$ $H_2$ for 5.7 mm glass thickness. In such specific embodiments, the balance of the process gas can be nitrogen gas, $N_2$. In some embodiments, the range of end points of a process gas may be $2\pm0.5\%$ $H_2$ for 2.2 mm glass thickness and a process gas of $6\pm0.5\%$ $H_2$ for 5.7 mm glass thickness. Embodiments of the methods, apparatuses, and systems may be configured to maintain furnace atmospheric pressure and maintain overall internal atmospheric flow rate to prevent ingress of the external atmosphere into the tin bath for reducing specific defects that may impact specific glass thicknesses.

Embodiments of our methods, apparatuses, and systems may include a control process and/or control system which may utilize locally targeted $H_2$ injection and/or $N_2$ injection. This has been surprisingly found to help reduce surface defects by injecting process gas to specific location or process areas in and around the furnace in a pre-selected way to help minimize tin monoxide (SnO) reactions at some locations within the furnace to help minimize or avoid tin (Sn) condensation at the roof region of the tin bath furnace while also facilitating sufficient reactivity and hydrogen concentration within the tin bath furnace to maintain the tin bath within a desired state to avoid impurity buildup that can contribute to bottom defects or other types of tin bath composition related problems. In some embodiments, a process gas, having a N2 and/or H2 can be injected in the furnace via one or more side walls between the tin surface and the tin bath roof, while a process gas, (N2), may be injected from the roof center line. This may help transport any defect causing agents, such as the atmospheric reactions of $H_2$ and SnO and/or other defect causing agents that may or may not be volatile, to the side wall regions of the furnace. Consequently, this may facilitate the tin or other defect causing agents to condensate on the side walls and move tin drip and/or other defects away from the roof and ceiling heater candles; thereby, potentially reducing top surface defects. For example, in some embodiments, the process gas can be mixed in an upper area above a tin bath adjacent to ceiling mounted heaters and/or electrical equipment for powering heaters for being mixed in this area between boundaries of the tin bath sides. Then the mixed process gas flows can be directed into the tin bath. This type of process gas injection into a tin bath can be configured create directed zones of atmosphere around a ribbon formed on the tin bath.

Embodiments of methods and systems can include a control process which may utilize locally controlled $H_2$ injection and/or $N_2$ injection to target specific areas based on tin-oxygen levels. The method may comprise using a calculated concentration difference between a tin-oxygen sensor measurement and a maximum tin-oxygen saturation level calculated from the tin bath temperature to increase or decrease process gases for specific locations. A decrease in the control value concentration difference may infer an increase in process gas, change in concentration mixture of $N_2$ and $H_2$ so the gas includes a higher concentration of $H_2$, and/or in increase in process gas flow rates. An increase in the control value concentration difference may infer a decrease in process gas, change in concentration mixture of $N_2$ and $H_2$ so the process gas has less. $H_2$, and/or decrease in process gas flow rates. This may subsequently reduce dissolved tin-oxygen levels which may reduce specific surface defects for specific locations.

Embodiments of methods, apparatuses, and systems can also include a control process which may utilize locally controlled $H_2$ injection to target areas based on glass thickness. The method may comprise using glass thickness as the control value to target areas that may create specific defects which impact specific glass thicknesses by increasing or decreasing process gas flow rates. This may include a linear correlation of glass thickness to process gas, $N_2/H_2$ mixture, flow rates with range end points of a process gas of $2\pm2\%$ $H_2$ for 2.2 mm glass thickness and a process gas of $6\pm2\%$ $H_2$ for 5.7 mm glass thickness. In some embodiments, end points of a process gas may be in the range of $2\pm1\%$ $H_2$ for 2.2 mm glass thickness and a process gas of $6\pm1\%$ $H_2$ for 5.7 mm glass thickness. In some embodiments, end points of a process gas may be in the range of $2\pm0.5\%$ $H_2$ for 2.2 mm glass thickness and a process gas of $6\pm0.5\%$ $H_2$ for 5.7 mm glass thickness. In the target area "forming section" may be defined as a collection of tin bath bays that house the top rollers, located towards the beginning of the tin bath after the glass entrance. The process gas flow rates may be reduced proportional to glass thickness where thickness may be <3.9 mm, which may decrease tin drip and/or potential other defects for these specific glass thicknesses in the forming section. In the target area "cooling section" may be defined as a collection of tin bath bays that house most of the water coolers, located toward the end of the tin bath where the glass ribbon exits. The process gas flow rates may be increased proportional to glass thickness where thickness may be >3.9 mm, which may decrease top tin and/or potential other defects for these specific glass thicknesses in the cooler section. Embodiments of methods and systems disclosed can be configured to maintain furnace atmospheric pressure and overall internal atmospheric flow rate to prevent ingress of the external atmosphere into the tin bath.

Embodiments of apparatuses, methods and systems can include a control process and systems for optimizing tin bath furnace atmospheric flow distribution by utilizing an extraction system from the tin bath side walls. A process gas (e.g. $N_2$) may be injected at the tin bath roof at a higher flow rate from the center line and a process gas (e.g. a mixture of $N_2$ and $H_2$) may be injected at a lower flow rate at the roof sides. This can create an internal gas flow from the tin bath roof to a vent near to the tin bath surface. This vent may remove SnO and/or other defect causing agents that may or may not be volatile from the surface of the tin bath to a collection tank. The SnO in the atmosphere could react with other SnO to create SnO2 (tin dioxide, a solid) or react with hydrogen of the process gas to create tin (Sn) and water ($H_2O$). Other reactions may also occur in the tank. The collection tank can include a large diameter pipe or specialty container in which the bottom of the pipe or container may be opened to remove Sn, SnO2, and/or other solid and particulate buildups. The collection tank may also include an internal metal mesh and/or other materials/types to slow the process gas to improve internal reactions and particulate collection. The process gas may be vented from the collection tank, recirculated back into the furnace, or a combination thereof. If recirculating the process gas, the process gas may be measured for particulates to ensure quality of the recirculated gas and to decide on the flow rate of the process gas mixture ($N_2/H_2$), whether to increase or decrease depending on the particulate measurement.

Increase in particulates may increase the $H_2$ in the process gas mixture and a decrease in particulates could decrease the $H_2$ in the process gas mixture. The inclusion of hydrogen with nitrogen in the process gas can be a linear range from 0% $H_2$ to 10% $H_2$. with the balance being nitrogen ($N_2$). The recycled process gas may be returned to the side wall of the tin bath between the inlet vent and below the tin bath roof which could be before, after, or in the same vertical plane of the inlet vent. A system to recycle process gas (e.g. a mixture of $N_2$ and $H_2$) may be utilized to help with the extraction system. Removing SnO and/or other defect causing agents that may be volatile from the tin bath can reduce overall defects and maintain a clean tin bath environment and atmosphere.

Embodiments of apparatuses, methods and systems may further include a control process which utilizes a correlation of defects to roof-mounted candle heater power levels at each specific section. Typically, the roof mounted heaters may be activated or adjusted to higher power when glass thickness increases. Embodiments can utilize a control scheme that includes decreasing power levels to the heaters in areas where tin condensate may be highest and increasing power levels in areas where tin condensate may be lowest to maintain the overall energy input desired while also trying to avoid formation of tin condensate. Embodiments can also include increasing venting or sweeping gas flow rates when heater power may be low or de-activated to prevent condensation buildup.

Embodiments of apparatuses, methods and systems can include a control process which utilizes purging of the roof and heater candle condensates during glass thickness transitions. This can include increasing heater power levels to a max range and increasing overall process gas flow rates or pulsing process gas flow rates from the roof. This may facilitate purging of many condensates from the roof and heater candles onto glass that may not have as much value, which can reduce defects on nominal glass that is of higher value during other operational conditions. This may be correlated to defects and the control alert may activate when purging may be required.

In some embodiment, the control value glass thickness may be inversely proportional to lehr speed, meaning lehr speed may be used as a control value in place of glass thickness and vice versa. Moreover, the control value glass thickness may be inversely proportional to roller speed, meaning roller speed may be used as a control value in place of glass thickness and vice versa. In yet other embodiments, the lehr speed, roller speed, and glass thickness parameters can all be utilized as control parameters or a combination of these variables can be utilized as control parameters.

In some embodiments, the addition of argon or other gases with the process gas may reduce defects. $N_2$ process gas can be interchangeable with a mixture of $N_2$ and Ar and process gas that is a mixture of $N_2$ and $H_2$ can be substituted with a mixture of $N_2$, $H_2$, and Ar.

In a first aspect, a process for controlling the manufacture of float glass on a tin bath is provided. The process can include determining one or more of: (a) a concentration of hydrogen and/or nitrogen to include in a first process gas having nitrogen and/or argon for injecting into a first zone of a tin bath furnace, (b) a flow rate of the first process gas for injecting into the first zone, and/or (c) atmospheric pressure of the atmosphere in the tin bath furnace in the first zone based on one or more of (i) thickness of a ribbon to be formed on the tin bath, (ii) atmospheric conditions within the tin bath furnace, (iii) ribbon speed, (iv) ribbon width, (v) tin conditions in the tin bath furnace, and/or (vi) measured defects of the ribbon. The process can also include determining one or more of: (d) a concentration of hydrogen and/or nitrogen to include in a third process gas having nitrogen and/or argon for injecting into a second zone and/or third zone of the tin bath furnace, (e) a flow rate of the third process gas for injecting into the second zone and/or third zone, and/or (f) atmospheric pressure of the atmosphere in the tin bath furnace in the third zone based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon. The process can also include determining a flow rate for injecting a second process gas comprising argon and/or nitrogen adjacent an interface of the first zone and the second zone so that hydrogen is not added into an atmosphere of the tin bath furnace via the injecting of the second process gas to facilitate maintenance of a pre-selected hydrogen content within the atmosphere throughout the tin bath furnace during formation of glass from the ribbon.

It should be appreciated that the second process gas can be an inert gas (e.g. comprising nitrogen and/or argon). The first process gas and the third process gas can include hydrogen mixed with nitrogen and/or argon. In some embodiments, the first process gas and the third process gas can have the same concentrations of hydrogen, nitrogen, and argon or the same concentrations of hydrogen and nitrogen. In other embodiments, the first process gas can have concentrations of hydrogen and nitrogen that differs from the concentrations of hydrogen and nitrogen of the third process gas. In yet other embodiments, the first process gas can have concentrations of hydrogen, argon, and nitrogen that differs from the concentrations of hydrogen, argon and nitrogen of the third process gas. The third process gas can be injected downstream of the location at which the second process gas is injected.

In a second aspect, the injecting of the second process gas occurs within the first zone adjacent the interface, within the second zone adjacent the interface, or at the interface. For instance, some embodiments can inject the second process gas at the interface between the first zone and the second zones. Other embodiments can inject the second process gas near this interface.

In a third aspect, the first process gas can be injected into the first zone and the third process gas can be injected into the second zone and/or third zone downstream of a location at which the second process gas is injected.

In a fourth aspect, the process can include a host device receiving glass manufacturing data for the tin bath furnace to update process modeling and updating the process modeling to determine whether one or more control parameters should be adjusted. This glass manufacturing data can include, for example, (i) the thickness of the ribbon formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon. This data can be provided via sensors and/or at least one computer device of the tin bath furnace.

In a fifth aspect, the process can include the host device communicating with a controller of the tin bath furnace or an operator device of the tin bath furnace to suggest adjustment of the one or more control parameters based on the updating of the process modeling. In some embodiments, the suggested adjustment can be based on an evaluation of the glass manufacturing data that the host device can receive and/or the updated process modeling that may be performed based on that received data.

In a sixth aspect, the determining of one or more of: (a) a concentration of hydrogen and/or nitrogen to include in a first process gas having nitrogen and/or argon for injecting into a first zone of a tin bath furnace, (b) a flow rate of the first process gas for injecting into the first zone, and/or (c) atmospheric pressure of the atmosphere in the tin bath furnace in the first zone based on one or more of (i) the thickness of a ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon can include determining the concentration of hydrogen to be included in the first process gas and the flow rate of the first process gas.

In a seventh aspect, the determining of one or more of: (d) a concentration of hydrogen and/or nitrogen to include in a third process gas having nitrogen and/or argon for injecting into a second zone and/or third zone of the tin bath furnace, (e) a flow rate of the third process gas for injecting into the second zone and/or third zone, and/or (f) atmospheric pressure of the atmosphere in the tin bath furnace in the third zone based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon can include determining the concentration of hydrogen to be included in the third process gas and the flow rate of the third process gas.

In an eighth aspect, the process can include determining a pressure of the atmosphere of the tin bath furnace adjacent the interface of the first zone and the second zone.

In a ninth aspect, the determining of the flow rate for injecting the second process gas adjacent the interface of the first zone and the second zone can be based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon.

In a tenth aspect, the process can include venting gas extracted from the atmosphere of the tin bath furnace in response to detection of a particulate material that exceeds a first threshold or meets a first threshold.

In an eleventh aspect, the process can also include recycling gas extracted from the atmosphere of the tin bath furnace after particulate material entrained within the extracted gas is removed from the extracted gas in response to detection of a particulate material that is at or below a second threshold.

In a twelfth aspect, the process can include adjusting a power level of one or more heating elements of the tin bath furnace based on detected tin condensate within the atmosphere and/or the heating elements. In some embodiments, the adjusting of the power level can be performed so that heating elements have increased power when the detected tin condensate is below a pre-selected low condensate threshold and heating elements have decreased power when the detected tin condensate is at or above a pre-selected high condensate threshold.

In a thirteenth aspect, the process can include determining that glass to be manufactured from the ribbon has a quality that is within a pre-selected low quality threshold and passing a purge flow along heating elements mounted to a roof of the tin bath furnace while the glass to be manufactured from the ribbon has the quality that is within the pre-selected low quality threshold to remove tin condensate from the heating elements and/or clean the heating elements.

In a fourteenth aspect, the process of the first aspect can include one or more features of the second aspect, third aspect, fourth aspect, fifth aspect, sixth aspect, seventh aspect, eighth aspect, ninth aspect, tenth aspect, eleventh aspect, twelfth aspect, and/or thirteen aspect. Embodiments can utilize all the features of all of these aspects or subparts of different aspects. It should therefore be appreciated that embodiments of the process can include one or more of the other aspects discussed herein. Embodiments of our process can also include other exemplary features of exemplary embodiments discussed herein.

In a fifteenth aspect, an apparatus to facilitate control of tin bath furnace operations is provided. Embodiments of the apparatus can be configured for implementation of an embodiment of our process. In some embodiments, the apparatus can include a computer device having a processor communicatively connected to a non-transitory computer readable medium and at least one transceiver. The computer device can be communicatively connectable to sensors of a tin bath furnace to receive data from the sensors. The computer device can be configured to determine one or more of: (a) a concentration of hydrogen and/or nitrogen to include in a first process gas having hydrogen, nitrogen and/or argon for injecting into a first zone of a tin bath furnace, (b) a flow rate of the first process gas for injecting into the first zone, and/or (c) atmospheric pressure of the atmosphere in the tin bath furnace in the first zone based on one or more of (i) thickness of a ribbon to be formed on the tin bath, (ii) atmospheric conditions within the tin bath furnace, (iii) ribbon speed, (iv) ribbon width, (v) tin conditions in the tin bath furnace, and/or (vi) measured defects of the ribbon. The computer device can also be configured to determine one or more of: (d) a concentration of hydrogen and/or nitrogen to include in a third process gas having nitrogen and/or argon for injecting into a second zone and/or third zone of the tin bath furnace, (e) a flow rate of the third process gas for injecting into the second zone and/or third zone, and/or (f) atmospheric pressure of the atmosphere in the tin bath furnace in the third zone based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon. The computer device can also be configured to determine a flow rate for injecting a second process gas comprising argon and/or nitrogen adjacent an interface of the first zone and the second zone so that hydrogen is not added into an atmosphere of the tin bath furnace via the injecting of the second process gas to facilitate maintenance of a pre-selected hydrogen content within the atmosphere throughout the tin bath furnace during formation of glass from the ribbon.

As noted above, the second process gas can be an inert gas comprising nitrogen and/or argon. The first process gas and the third process gas can include hydrogen mixed with nitrogen or hydrogen mixed with nitrogen and argon. In some embodiments, the first process gas and the third process gas can have the same concentrations of hydrogen, nitrogen, and argon or same concentrations of hydrogen and nitrogen. In other embodiments, the first process gas can have concentrations of hydrogen and nitrogen that differs from the concentrations of hydrogen and nitrogen of the third process gas. In yet other embodiments, the first process gas can have concentrations of hydrogen, argon, and nitrogen that differs from the concentrations of hydrogen, argon and nitrogen of the third process gas. The third process gas can be for injection into the atmosphere of the tin bath furnace downstream of the location at which the second process gas is injected into the atmosphere of the tin bath furnace and the first process gas can be for injection upstream of the location at which the second process gas is injected into the atmosphere of the tin bath furnace.

In a sixteenth aspect, the apparatus to facilitate control of tin bath furnace operations can be configured so that the computer device is a host device and the data from the sensors includes glass manufacturing data for the tin bath furnace (e.g. surface defect data or other data for measured defects of the ribbon). The host device can be configured to update process modeling to determine whether one or more control parameters should be adjusted based on the data from the sensors. The host device can be communicatively connectable with a controller of the tin bath furnace and/or an operator device of the tin bath furnace to communicate a suggested adjustment of the one or more control parameters based on the update of the process modeling.

In a seventeenth aspect, the apparatus to facilitate control of tin bath furnace operations can be configured so that the computer device is configured to adjust a power level of one or more heating elements of the tin bath furnace based on detected tin condensate within the atmosphere of the tin bath furnace and/or the heating elements.

In an eighteenth aspect, the apparatus to facilitate control of tin bath furnace operations can be configured so that the computer device is configured to adjust a power level of one or more heating elements of the tin bath furnace based on detected tin condensate within the atmosphere so that the one or more heating elements have increased power when the detected tin condensate is below a pre-selected low condensate threshold and the one or more of the heating elements have decreased power when the detected tin condensate is at or above a pre-selected high condensate threshold.

In a nineteenth aspect, the apparatus to facilitate control of tin bath furnace operations of the fifteenth aspect can include one or more features of the sixteenth aspect, seventeenth aspect, and/or eighteenth aspect. Embodiments can utilize all the features of all of these aspects or subparts of different aspects. It should therefore be appreciated that embodiments of the apparatus of the fifteenth aspect can include features of one or more of the other aspects discussed herein. Embodiments of our apparatus of the fifteenth aspect can also include other exemplary features of exemplary embodiments discussed herein.

In a twentieth aspect, an apparatus for manufacturing glass is provided. The apparatus can include a tin bath furnace having a tin bath and an atmosphere above the tin bath. The tin bath furnace can be configured to form a ribbon on the tin bath. The tin bath furnace can have a first zone, a second zone, and a third zone where the second zone is between the first zone and the third zone. The tin bath furnace can be connected to at least one source of hydrogen gas, at least one source of nitrogen gas and/or at least one source of argon gas such that a first process gas having hydrogen mixed with nitrogen and/or argon is injectable into the first zone, a second process gas comprising argon and/or nitrogen is injectable adjacent an interface of the first zone and the second zone so that hydrogen is not added into an atmosphere of the tin bath furnace via injecting of the second process gas to facilitate maintenance of a pre-selected hydrogen content within the atmosphere throughout the tin bath furnace during formation of glass from the ribbon, and a third process gas having hydrogen mixed with nitrogen and/or argon is injectable into the second zone and/or third zone of the tin bath furnace upstream of where the second process gas is injectable.

As noted above, the second process gas can be an inert gas comprising nitrogen and/or argon. The first process gas and the third process gas can include hydrogen mixed with nitrogen or hydrogen mixed with nitrogen and argon. In some embodiments, the first process gas and the third process gas can have the same concentrations of hydrogen, nitrogen, and argon or the same concentrations of hydrogen and nitrogen. In other embodiments, the first process gas can have concentrations of hydrogen and nitrogen that differs from the concentrations of hydrogen and nitrogen of the third process gas. In yet other embodiments, the first process gas can have concentrations of hydrogen, argon, and nitrogen that differs from the concentrations of hydrogen, argon and nitrogen of the third process gas. The third process gas can be for injection into the atmosphere of the tin bath furnace downstream of the location at which the second process gas is injected into the atmosphere of the tin bath furnace and the first process gas can be for injection upstream of the location at which the second process gas is injected into the atmosphere of the tin bath furnace.

In a twenty-first aspect, the apparatus for manufacturing glass can include heating elements mounted to a roof of the tin bath furnace. The heating elements can be configured so that a power level of one or more of the heating elements is adjustable based on detected tin condensate within the atmosphere and/or the heating elements. For example, the heating elements can be configured for adjusting of the power level so that heating elements have increased power when the detected tin condensate is at or below a pre-selected low condensate threshold and heating elements have decreased power when the detected tin condensate is at or above a pre-selected high condensate threshold.

In a twenty-second aspect, the apparatus for manufacturing glass can include a gas extraction system in communication with the atmosphere of the tin bath furnace to extract particulates entrained within gas of the atmosphere.

In a twenty-third aspect, the apparatus for manufacturing glass can include a plurality of sensors positioned to monitor operations of the tin bath furnace. The sensors can be communicatively connected to at least one computer device. The at least one computer device can have a processor communicatively connected to a non-transitory computer readable medium and at least one transceiver. The at least one computer device can be configured to determine one or more of: (a) a concentration of hydrogen and/or nitrogen to include in a first process gas having nitrogen and/or argon for injecting into a first zone of a tin bath furnace, (b) a flow rate of the first process gas for injecting into the first zone, and/or (c) atmospheric pressure of the atmosphere in the tin bath furnace in the first zone based on one or more of (i) thickness of a ribbon to be formed on the tin bath, (ii) atmospheric conditions within the tin bath furnace, (iii) ribbon speed, (iv) ribbon width, (v) tin conditions in the tin bath furnace, and/or (vi) measured defects of the ribbon. The computer device can also be configured to determine one or more of: (d) a concentration of hydrogen and/or nitrogen to include in a third process gas having nitrogen and/or argon for injecting into a second zone and/or third zone of the tin bath furnace, (e) a flow rate of the third process gas for injecting into the second zone and/or third zone, and/or (f) atmospheric pressure of the atmosphere in the tin bath furnace in the third zone based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon. The computer device can also be configured to determine a flow rate for injecting the second process gas comprising argon and/or nitrogen adjacent the interface of the first zone and the second zone so that hydrogen is not added into an atmosphere of the tin bath furnace via the injecting of the second process gas to facilitate maintenance of the pre-selected hydrogen content within the atmosphere throughout the tin bath furnace during formation of glass from the ribbon.

In a twenty-fourth aspect, the apparatus for manufacturing glass can include a plurality of sensors positioned to monitor operations of the tin bath furnace. The sensors can comprise sensors positioned and configured for measuring hydrogen concentration, tin bath atmospheric dew point, and tin bath atmospheric oxygen potential in the first zone, second zone, and third zone.

In a twenty-fifth aspect, the apparatus for manufacturing glass can include a computer device that is configured as a host device. Data from sensors positioned to measure data related to tin bath furnace operations can be communicatable to the host device and provide such data to the computer device. The data the sensors can provide can includes glass manufacturing data for the tin bath furnace. The host device can be configured to update process modeling to determine whether one or more control parameters should be adjusted based on the data from the sensors. The host device can also be communicatively connectable with a controller of the tin bath furnace and/or an operator device of the tin bath furnace to communicate a suggested adjustment of the one or more control parameters based on the update of the process modeling.

In a twenty-sixth aspect, the apparatus for manufacturing glass of the twentieth aspect can include one or more features of the twenty-first aspect, twenty-second aspect, twenty-third aspect, twenty-fourth aspect, twenty-fifth aspect and/or twenty-sixth aspect. Embodiments can utilize all the features of all of these aspects or subparts of different aspects. It should therefore be appreciated that embodiments of the apparatus of the twentieth aspect can include features of one or more of the other aspects discussed herein. Embodiments of our apparatus of the twentieth aspect can also include other exemplary features of exemplary embodiments discussed herein.

Other details, objects, and advantages of our controllers that are configured to facilitate control of operations of tin bath float processing used to manufacture glass, glass manufacturing apparatuses, glass manufacturing control systems, and methods of making and using the same will become apparent as the following description of certain exemplary embodiments thereof proceeds.

BRIEF DESCRIPTION OF THE DRAWINGS

Exemplary embodiments of our controllers that are configured to facilitate control of operations of tin bath float processing used to manufacture glass, glass manufacturing apparatuses, glass manufacturing control systems, and methods of making and using the same are shown in the drawings included herewith. It should be understood that like reference characters used in the drawings may identify like components.

FIG. 4 is a flow chart illustrating a first exemplary embodiment of a process for controlling glass manufacturing or glass manufacturing operations.

FIG. 5 is a flow chart illustrating a second exemplary embodiment of a process for controlling glass manufacturing or glass manufacturing operations.

DETAILED DESCRIPTION

Figure 1:
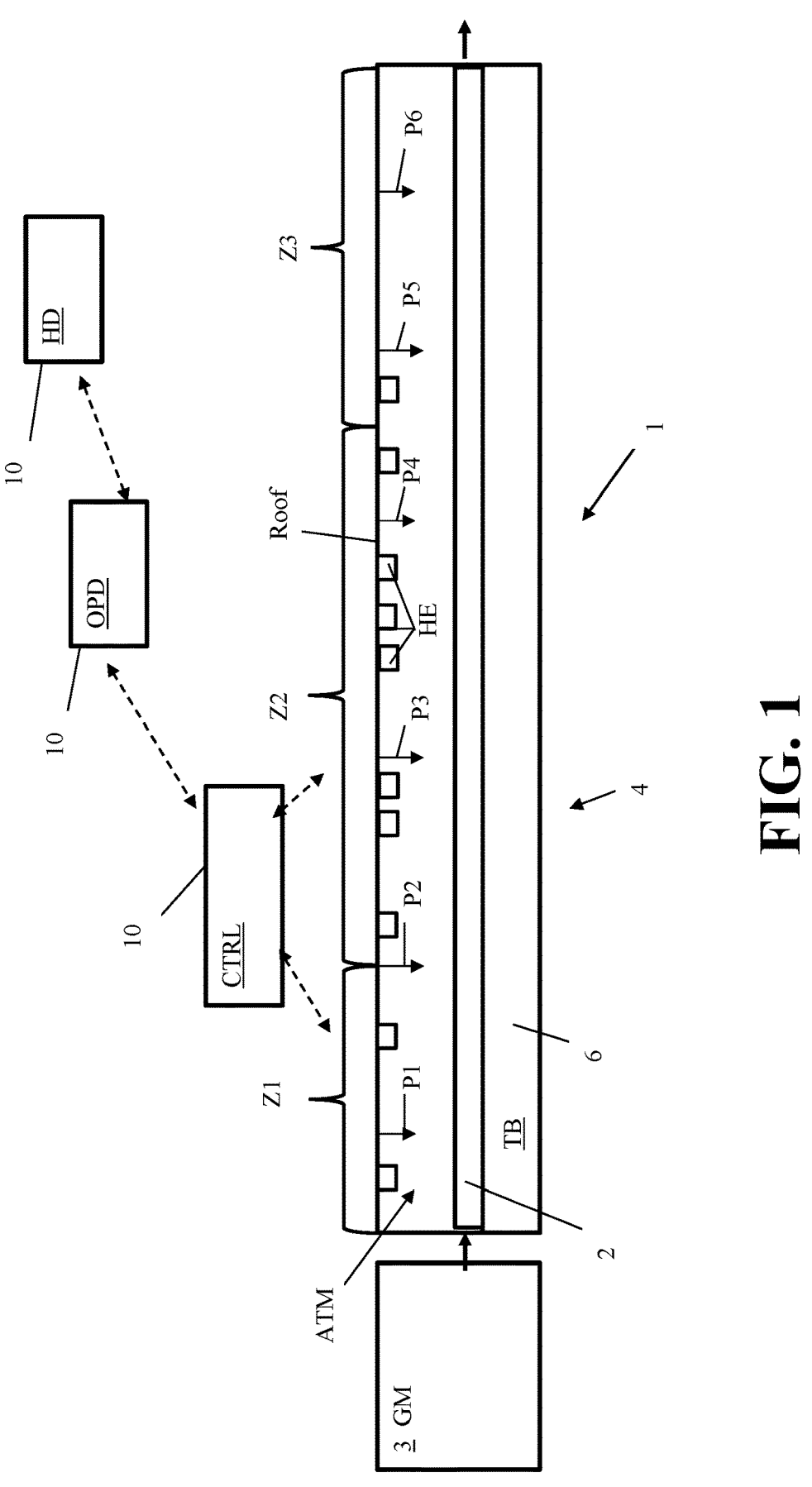
FIG. 1 is a schematic block diagram providing a side view of a first exemplary embodiment of our glass manufacturing apparatus having an exemplary embodiment of our control system for controlling of operations of the glass manufacturing apparatus.
Figure 2:
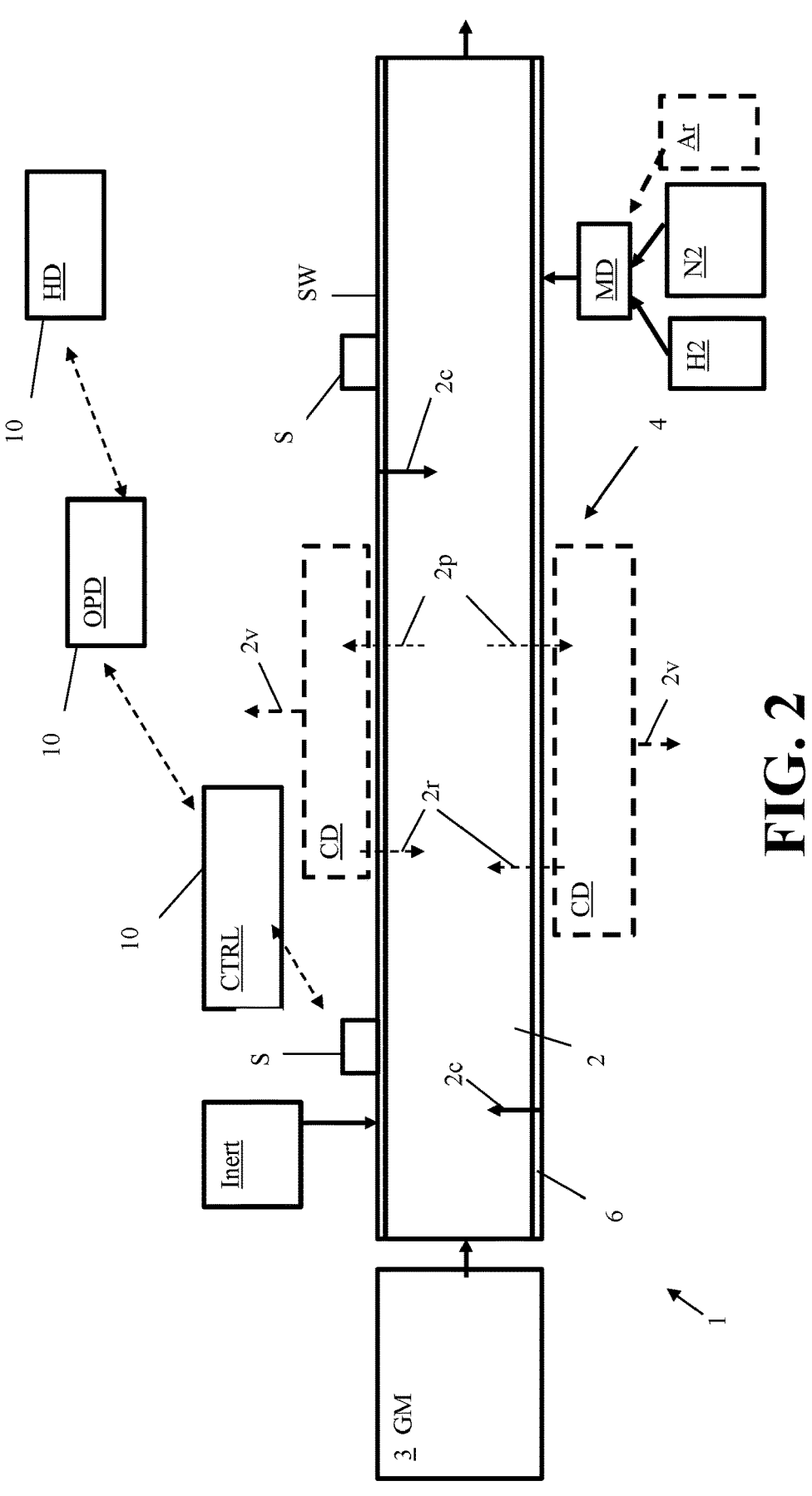
FIG. 2 is a schematic block diagram providing a top view of the first exemplary embodiment of our glass manufacturing apparatus having an exemplary embodiment of our control system for controlling of operations of the glass manufacturing apparatus.

Referring to FIGS. 1-5, a glass manufacturing apparatus 1 can include a glass melting furnace 3 (GM) that can melt material for forming molten glass. The material that is melted can be any suitable glass material. For example, the glass material that is melted into molten glass can include soda, lime, and silica for forming soda-lime glass, or soda-lime-silica glass (e.g. lime, soda, silica, dolomite, aluminum oxide, a suitable fining agent or combination of finding agents, silica, trona, sand, and/or feldspar, etc.). The glass material that is molten can alternatively be formulated for another type of glass such as, for example borosilicate glass or other type of glass.

The molten glass can be output from the glass melting furnace 3 for being fed to a tin bath furnace 4 for forming of a ribbon 2 that is manipulated via rollers and other glass body forming mechanisms in a first zone Z1 of the tin bath furnace 4 to form an elongated ribbon 2 that floats on top of molten tin (e.g. liquid tin) of a tin bath 6 (TB). The tin bath furnace 4 can include a refractory lined bath to retain the molten tin of the tin bath 6 at a pre-selected tin bath temperature. The tin bath furnace 4 can also include sidewalls SW and a roof (Roof) to retain an atmosphere ATM of gases above the tin bath.

The atmosphere ATM of gases can include a mixture of hydrogen and nitrogen or a mixture of argon, nitrogen, and hydrogen in some embodiments. The atmosphere ATM can be provided to form a protective atmosphere around the ribbon 2 to minimize oxygen in air that may enter the tin bath furnace 4 via imperfect seals or other pathways of ingress from oxidating the material of the ribbon 2 or the tin of the tin bath as much as possible.

The roof of the tin bath furnace 4 can include a plurality of heating elements HE or have a plurality of heating elements HE attached to the roof. The heating elements can be electric heaters or other type of heating element that can provide heating at the roof of the tin bath furnace 4. The heating of the heating elements HE can be adjustable between a low level of heating and a high level of heating along with multiple intermediate levels of heating between the low level of heating and the high level of heating.

The tin bath furnace 4 can also include a plurality of process gas injection outlets or nozzles. The process gas injection outlets can be defined in the roof and/or sidewalls of the tin bath furnace 4. At least one process gas can be injected at the different spaced part outlets as indicated via process gas injections P1, P2, P3, P4, P5 and P6 shown in FIG. 1. It should be appreciated that less than six injection outlets or injections or more than six injection outlets or process gas injections can be utilized in different embodiments.

In some embodiments, a first process gas that is a combination of nitrogen and hydrogen gas can be injected into the tin bath furnace 4 to form the atmosphere (ATM) of the tin bath furnace 6 via multiple spaced apparat roof outlets (e.g. process gas injections P1, P3, P4, P5 and P6). In some embodiments, a second process gas that is only comprised of nitrogen or a mixture of nitrogen and argon can also be injected into the atmosphere (ATM) of the tin bath furnace 4 via one or more of the outlets (e.g. process gas injection P2). This injection of the second process gas can occur while other outlets inject the first process gas. The injected first and second process gases can mix within the atmosphere to form the atmosphere ATM above the tin bath 6 and below the roof of the tin bath furnace 4.

The tin bath 6 can be below the formed ribbon 2 that is formed via the molten glass material from the glass melting furnace 3 being poured or otherwise fed onto the tin bath 6 via a feed device (e.g. a tweel device or other suitable molten glass matrix feed device) and subsequently rolled or otherwise manipulated so that the molten glass matrix material forms a desired ribbon 2 having a desired thickness and width on the tin bath 6. The desired thickness and width of the ribbon 2 can be based on product specifications for forming a particular desired sheet of glass and the size and dimensions of the tin bath furnace 4, for example.

The ribbon 2 that is formed in the first zone Z1 can be adjusted in thickness when the process is updated to make a new sized product in a continuous process. Such a thickness adjustment can occur, for example, from making a ribbon of about 2 mm in thickness to forming a ribbon of about 6 mm in thickness and vice versa. The thickness of the ribbon 2 can be adjusted over time to make different sized (thick) glass in a range of between 1 mm and 6 mm in some embodiments. In other embodiments, the thickness of the ribbon can be adjusted in other size ranges (e.g. 2 mm to 5.7 mm, 1 mm to 10 mm, etc.).

The output of the glass matrix material and forming of the ribbon 2 can occur in a first zone Z1 of the tin bath furnace 4 and be performed in a continuous manner to provide a continuous manufacturing process for glass. The first zone Z1 can be considered a forming zone or ribbon forming zone.

The tin bath furnace 4 can also include a second zone Z2 and a third zone Z3. The second zone Z2 can be defined between the first zone Z1 and the third zone Z3. The second zone Z2 can be considered a transition zone in which the molten glass of the ribbon 2 can be transitioned or pulled from a wider width to a finalized width and thickness into a glass body for making glass. The third zone Z3 can be considered a cooling zone and can be configured to cool the ribbon 2 after it has passed through the second zone Z2 to solidify the ribbon 2 for forming a solid glass that can be subsequently output from the tin bath furnace 4 for being cut into desired sizes for forming of glass for mirrors, glass for windows, automotive glass, furniture glass, insulated glass, or glass for other devices. The third zone Z3 can include coolers or other devices to facilitate the cooling of the ribbon 2 for solidifying the glass of the ribbon 2 to form glass suitable for being fed to an annealer to undergo annealing. After being annealed, the formed glass can be inspected and/or cut to a desired size and/or geometry. After the glass is cut to desired sizes, the formed glass can be packaged for shipment. The glass output from the tin bath, annealer, and/or cutting processes can also undergo optical evaluation or other evaluation by one or more quality sensors for providing glass manufacturing quality metric data to the local controller CTRL, operator device OPD and/or remote host device HD. This type of glass manufacturing quality metric data can include measured surface defect data, which can be obtained from the glass ribbon 2 prior to the ribbon being cut to a desire size or geometry. The measured surface defect data can be data of measured defects of the ribbon 2 obtained via the optical evaluation via one or more quality sensors. As discussed herein, the host device HD, operator device OPD and/or local controller CTRL can be configured to receive this measured surface defect data and utilize the data of the measured defects of the ribbon 2 in a feedback loop for evaluation of empirical data of tin bath furnace operations for determining adjustments to one or more target parameter values for operations of the tin bath furnace.

The tin bath furnace can include a plurality of sensors S. The sensors S can be measurement devices, concentration sensors, temperature sensors, pressure sensors, composition sensors, quality sensors configured to detect surface defects in the ribbon 2, and/or other sensors. The sensors can be communicatively connected to a local controller (CTRL), operator device OPD and/or host device HD. The local controller can be a computer device 10 that is communicatively connected to the sensors S to receive sensor data from the sensors to facilitate automated process control for the operation of the tin bath furnace. The local controller CTRL can be communicatively connected to an operator device OPD and/or a remote host device HD that can be configured to provide process control implementation oversight and/or control adjustment suggestions for updating control parameters used by the local controller CTRL and/or operator device OPD. The operator device OPD and the host device HD can be computer devices 10 as well and can be communicatively connected to the sensors S and/or local controller CTRL to receive sensor data from the sensors S. Controller data from the local controller CTRL can also be provided to the operator device OPD and/or host device HD via communicative connections between these devices.

Figure 3:
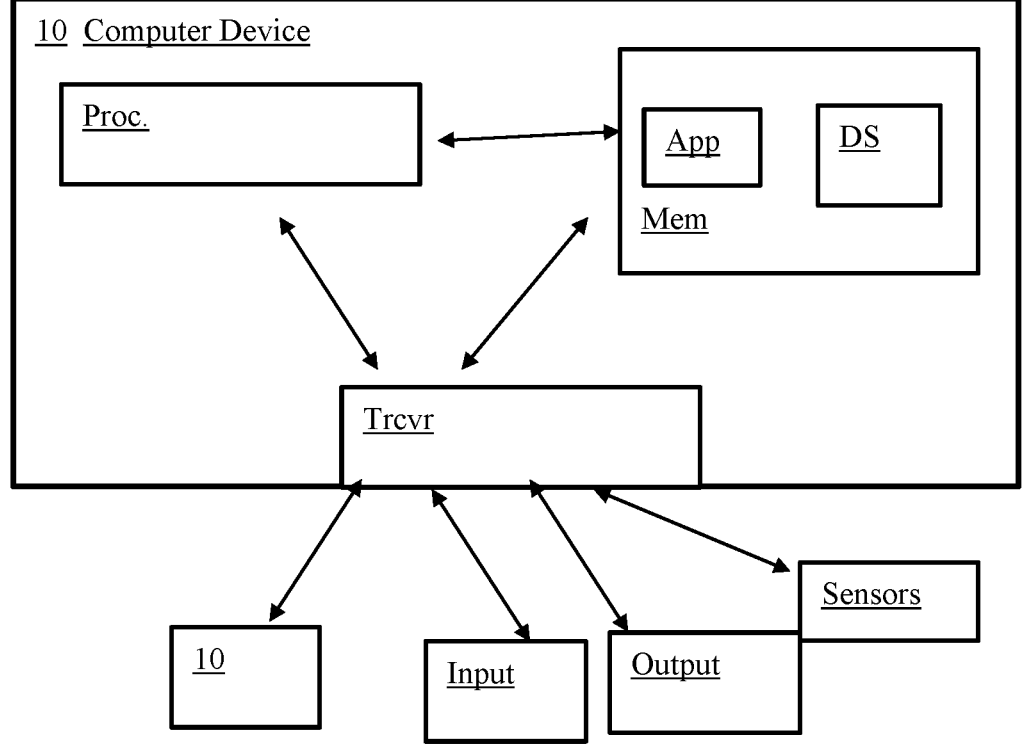
FIG. 3 is a block diagram of an exemplary embodiment of a computer device 10 that is illustrated in FIGS. 1 and 2.

As may best be seen from FIG. 3, each computer device 10 can include a processor (Proc.) that is communicatively connected to at least one transceiver (Trcvr) and at least one non-transitory computer readable medium (Mem). The transceiver can include one or more communicative interfaces, such as at least one network transceiver, at least one near field communication transceiver and/or at least one wireless transceiver. The transceiver (Trcvr) can be configured to facilitate communicative connections the computer device 10 can have to other computer devices 10, input devices (Input), output devices (Output) and/or sensors. The non-transitory computer readable medium (Mem) can have one or more applications (App) stored thereon as well as one or more data stores (DS), such as files, databases, or other types of data stores. Code of an application can be run by the processor (Proc.) to cause the computer device 10 to perform various actions and/or processes. Running of the code of an application can also result in use of one or more data stores DS during the running of the application (App).

The one or more input devices (Input) can include a keyboard, key pad, pointer device, touch screen, microphone, or other type of input device that can be communicatively connected to the processor or the computer device 10. The one or more output devices (Output) can include a speaker, display, printer, or other type of output device that can be communicatively connected to the processor or the computer device 10. The other computer devices 10 can be communicatively connectable to the computer device 10 via a network connection (e.g. local area network connection, wide area network connection, cellular network connection, internet connection, etc.). The communicative connections between computer devices 10 (e.g. between the local controller CTRL and operator device OPD and/or either of these devices and host device HD) can involve intermediate devices such as border control devices, access points, or other types of intermediate nodes between the communicatively connected computer devices 10.

The controller CTRL, operator device OPD and/or remote host device HD can be configured to implement one or more control schemes for controlling operations of the glass manufacturing process utilized by the tin bath furnace 4. Examples of these control schemes are illustrated in FIGS. 4 and 5. For example, in a first step S1, a thickness for a glass ribbon 2 can be determined and initial hydrogen and nitrogen injection concentrations can be determined for the different zones of the tin bath furnace. The hydrogen and nitrogen injection concentrations can define the mix of hydrogen included in nitrogen for process gas injections of process gas injection flows included in the first zone Z1, second zone Z2 and third zone Z3. The hydrogen concentration for the process gas can range from over 0 volume percent (vol %) hydrogen to 10 vol % hydrogen in some embodiments. Each outlet can have its own specific hydrogen concentration setting or multiple outlets can utilize the same setting. The determination of hydrogen concentrations can also include determining that at least one process gas injection can utilize a second process gas comprised of nitrogen and/or argon that is provided by a second source of gas (Inert). The second source of gas can be a source of nitrogen and/or a source of argon (e.g. argon and nitrogen storage vessels in which the nitrogen and argon can be mixed to a pre-selected concentration of argon and nitrogen for providing as the second process gas or a source of nitrogen that can provide a second process gas of nitrogen gas (e.g. consisting of nitrogen gas or comprised almost entirely of nitrogen gas). In some embodiments, the injection of an inert second process gas can occur at least at one location between the first zone Z1 and the second zone Z2. For example, such an injection of an inert second process gas can be a second process gas injection P2 that is located at the interface of the first zone Z1 and second zone Z2 or within one of these zones and near such an interface. This second process gas injection P2 location can be between at least one first process gas injection location within the first zone Z1 and numerous downstream first process gas and/or third process gas injection locations P3, P4, P5, and P6 positioned in the second zone Z2 and third zone Z3 downstream of the second process gas injection location.

Each injection location can utilize an injection of a process gas having a pre-selected concentration of nitrogen, argon and/or hydrogen so that each zone has different concentrations of hydrogen. For example, the first zone Z1 can have a hydrogen concentration of 3 vol % to 10 vol % or range from above 0 vol % to 10 vol %. The second zone Z2 can have a hydrogen concentration range of 0 vol % to 5 vol % or of 0 vol % and 10 vol % hydrogen and the third zone can have a hydrogen concentration in a range of above 0 vol % to 6 vol % or 1 vol % to 10 vol %.

In some embodiments, for example, the first process gas injection location P1 can inject a gas having a hydrogen content of 3 vol % to 10 vol % hydrogen with the remainder of the gas being nitrogen (e.g. 97 vol % nitrogen to 90 vol % nitrogen) or a mix of argon and nitrogen (e.g. from 80 vol % nitrogen to less than 97 vol % nitrogen and greater than 0 vol % argon to 10 vol % argon). The second process gas injection location P2 can inject a gas having a hydrogen concentration of 0 vol % and be entirely nitrogen or be a mix of 90 vol % to 100 vol % nitrogen and 0 vol % and 10 vol % argon. The third process gas injection location P3 can inject a gas having a hydrogen content of 1 vol % to 10 vol % hydrogen with the remainder of the gas being nitrogen (e.g. 99 vol % nitrogen to 90 vol % nitrogen) or a combination of nitrogen and argon where argon can be provided so it is between 0 vol % and 10 vol % of the gas (e.g. the injected gas is between 98 vol % nitrogen, 1 vol % hydrogen, and 1 vol % argon to 80 vol % nitrogen, 10 vol % argon, and 10 vol % hydrogen). The fourth process gas injection location P4 can inject a gas having a hydrogen content of 1 vol % to 10 vol % hydrogen with the remainder of the gas being nitrogen (e.g. 99 vol % nitrogen to 90 vol % nitrogen) or a combination of nitrogen and argon where argon can be provided so it is between 0 vol % and 10 vol % of the gas (e.g. the injected gas is between 98 vol % nitrogen, 1 vol % hydrogen, and 1 vol % argon to 80 vol % nitrogen, 10 vol % argon, and 10 vol % hydrogen). The fifth process gas injection location P5 can inject a gas having a hydrogen content of 1 vol % to 10 vol % hydrogen with the remainder of the gas being nitrogen (e.g. 99 vol % nitrogen to 90 vol % nitrogen) or a combination of nitrogen and argon where argon can be provided so it is between 0 vol % and 10 vol % of the gas (e.g. the injected gas is between 98 vol % nitrogen, 1 vol % hydrogen, and 1 vol % argon to 80 vol % nitrogen, 10 vol % argon, and 10 vol % hydrogen). The sixth process gas injection location P6 can inject a gas having a hydrogen content of 1 vol % to 10 vol % hydrogen with the remainder of the gas being nitrogen (e.g. 99 vol % nitrogen to 90 vol % nitrogen) or a combination of nitrogen and argon where argon can be provided so it is between 0 vol % and 10 vol % of the gas (e.g. the injected gas is between 98 vol % nitrogen, 1 vol % hydrogen, and 1 vol % argon to 80 vol % nitrogen, 10 vol % argon, and 10 vol % hydrogen).

As another example, some embodiments can be configured so that the first process gas injection location P1 can inject a gas having a hydrogen content of 3 vol % to 10 vol % hydrogen with the remainder of the gas being nitrogen (e.g. 97 vol % nitrogen to 90 vol % nitrogen) or a combination of nitrogen and argon (e.g. from 80 vol % nitrogen to less than 97 vol % nitrogen and greater than 0 vol % argon to 10 vol % argon). The second process gas injection location P2 can inject a gas having a hydrogen concentration of 0 vol % and be entirely nitrogen (e.g. 100 vol % nitrogen) or be a mix of 90 vol % to 100 vol % nitrogen and 0 vol % and 10 vol % argon. The third process gas injection location P3 can inject a gas having a hydrogen content of 0 vol % to 5 vol % hydrogen with the remainder of the gas being nitrogen (e.g. 100 vol % nitrogen to 95 vol % nitrogen) or a combination of nitrogen and argon where argon can be provided so it is between 0 vol % and 10 vol % of the gas (e.g. the injected gas is between 100 vol % nitrogen, 0 vol % hydrogen, and 0 vol % argon to 85 vol % nitrogen, 10 vol % argon, and 5 vol % hydrogen). The fourth process gas injection location P4 can inject a gas having a hydrogen content of 0 vol % to 5 vol % hydrogen with the remainder of the gas being nitrogen (e.g. 100 vol % nitrogen to 95 vol % nitrogen) or a combination of nitrogen and argon where argon can be provided so it is between 0 vol % and 10 vol % of the gas (e.g. the injected gas is between 100 vol % nitrogen, 0 vol % hydrogen, and 0 vol % argon to 85 vol % nitrogen, 10 vol % argon, and 5 vol % hydrogen). The fifth process gas injection location P5 can inject a gas having a hydrogen content of 1 vol % to 6 vol % hydrogen with the remainder of the gas being nitrogen (e.g. 99 vol % nitrogen to 94 vol % nitrogen) or a combination of nitrogen and argon where argon can be provided so it is between 0 vol % and 10 vol % of the gas (e.g. the injected gas is between 99 vol % nitrogen, 1 vol % hydrogen, and 0 vol % argon to 84 vol % nitrogen, 10 vol % argon, and 6 vol % hydrogen). The sixth process gas injection location P6 can inject a gas having a hydrogen content of 1 vol % to 6 vol % hydrogen with the remainder of the gas being nitrogen (e.g. 99 vol % nitrogen to 94 vol % nitrogen) or a combination of nitrogen and argon where argon can be provided so it is between 0 vol % and 10 vol % of the gas (e.g. the injected gas is between 99 vol % nitrogen, 1 vol % hydrogen, and 0 vol % argon to 84 vol % nitrogen, 10 vol % argon, and 6 vol % hydrogen).

The first and second process gas injections can be made consistent with the determined concentrations and flow rates and data relating to tin condensates, bath composition and/or glass quality metric data that can be evaluated in a second step S2 during that processing. In a third step S3, processing guidelines for operations of the tin bath furnace 4 can be updated based on the evaluated empirical data. A host device HD can receive such data, for example, and update a processing model via a pre-defined machine learning algorithm to update control parameter setting values for gas injection flow rates and gas injection concentrations as well as other process control parameters (e.g. heating element power levels, lehr speed, etc.). The local controller CTRL and/or operator device OPD may also, or alternatively, receive such data and perform this evaluation in the third step. In a fourth step S4, one or more changes to the automated processing control parameter target values can then be suggested for adjusting the processing of the glass manufacturing being performed by the tin bath furnace 4. Such a suggestion can be made via the host device HD sending a communication for display and/or other output at an operator device OPD so that an operator can receive the suggestion and enter input to control parameters to be communicated to the local controller CTRL for adjusting one or more control parameters based on the suggested changes communicated by the host device HD. Alternatively, the operator device OPD can make such a suggestion via its output device or a communication with an output device to facilitate input to be provided by the operator concerning those changes. As yet another alternative, it is contemplated that the local controller CTRL can also or alternatively perform such an evaluation and provide a communication to an operator device OPD to facilitate the making of a change to at least one control parameter based on the communicated suggestion.

An operator can utilize his or her operator device OPD to provide input for adjusting a control parameter. Such an input can be facilitated by a graphical user interface (GUI) of an automated process control program run at the operator device and communication connections the operator device OPD has with the local controller CTRL and/or the host device HD, for example. Examples of adjustments in the control parameters can include adjusting the concentration of hydrogen, nitrogen, and/or argon in one or more of the process gases or injection points for the process gases.

The glass manufacturing process that can be overseen and/or adjusted via the host device HD, operator device OPD and/or local controller CTRL can be appreciated from the exemplary process shown in FIG. 5. In a first step ST1, molten glass can be fed into a tin bath 6 to form a ribbon 2 having a desired width and/or thickness. In a second step ST2, a first process gas at a first flow rate can be injected into the first zone Z1 for formation of the ribbon. The first flow rate can be a suitable flow rate and the first process gas can have a pre-selected concentration of hydrogen mixed with nitrogen gas (e.g. hydrogen of between 1 vol % and 10 vol % with the balance being nitrogen or the balance being a combination of nitrogen and argon, etc.). In a third step ST3, a second process gas (e.g. nitrogen or a mixture of nitrogen and argon) can be injected at a second flow rate into a second zone Z2, at an interface between the first zone Z1 and second zone Z2, or near such an interface within the first zone Z1 or within the second zone Z2 (e.g. at second gas injection P2 that is downstream of first gas injection P1 and upstream of subsequent third, fourth, fifth, and sixth gas injections P3-P6.). The second process gas can be an inert gas provided via at least one source of inert gas (Inert). The first process gas and/or third process gas can be provided via a source of hydrogen gas (H2), a source of nitrogen gas (N2) and/or a source or argon gas (Ar) that can be mixed via a mixing device MD for forming the first and/or third process gas having a pre-selected concentration of hydrogen as well as a remaining balance of nitrogen or nitrogen and argon. The hydrogen concentration can range from greater than 0 vol % hydrogen to 10 vol % hydrogen for the first and third process gases. Argon, when present, can also be provided in the gases so that the argon concentration is between 0 vol % to 10 vol % in the injected gas. In contrast, the second process gas provided by the at least one source of inert gas (Inert) may not have any hydrogen mixed therein (e.g. may be only nitrogen or may include nitrogen mixed with argon). For instance, the inert gas of the second process gas can be 100 vol % nitrogen or be a mixture of nitrogen and argon where the nitrogen is less than 100 vol % to 90 vol % of the inert gas and argon is greater than 0 vol % and no more than 10 vol % of the injected inert gas.

In a fourth steps ST4, the first process gas and/or the third process gas can be injected into the second zone Z2 downstream of where the second process gas is injected and/or be injected into the third zone Z3 downstream of where the second process gas is injected to increase the hydrogen content within the atmosphere ATM or maintain the hydrogen content within the atmosphere ATM in these zones. The injections of the first, second and/or third process gases of the second, third, and fourth steps ST2, ST3, and ST4 can all occur at the same time. In an optional fifth step ST5 shown in broken line in FIG. 5, the injection of these process gases can be adjusted based on glass thickness, ribbon thickness, ribbon speed, ribbon width, tin conditions, tin bath atmospheric conditions, glass manufacturing quality feedback data (e.g. glass quality metric data, measured defects of the ribbon, etc.) and/or empirical processing data collected by the sensors S. The adjustment in the injection of the process gas can include adjustment in concentrations of hydrogen, nitrogen, and/or argon as well as adjusting of flow rates of the injected gases at one or more injection points of one or more zones. The adjustments can all occur at the same time or can occur at different times (e.g. an adjustment in concentration and/or flow rate for a first injection point location can occur and subsequent other adjustments at other injection points can occur thereafter for different zones or other injection locations).

We have surprisingly found that the injection of an inert second process gas near the interface between the first zone Z1 and the second zone Z2 can have a significant impact on reducing the formation of defects on the ribbon 2 during manufacturing via the tin bath furnace 4. In some evaluations we have conducted, it was determined that this injection at this location (e.g. at a location of process gas injection P2 or near this location) can contribute to a 5% to 35% reduction in surface defects, for example. We determined that this improvement can be contributed, at least in part, to the inert gas injection helping to counteract build-up of hydrogen within the atmosphere ATM downstream of the first zone Z1. The injection of inert gas is believed to help better maintain hydrogen concentrations within the atmosphere ATM so that the hydrogen concentration is more uniform by avoiding a build-up of hydrogen that may occur due to unreacted hydrogen in the first zone Z1 inadvertently increasing the hydrogen concentration within the atmosphere ATM in the second zone Z2 and/or third zone Z3 as the gases flow in the atmosphere ATM during glass ribbon 2 forming, cooling, and/or annealing. By permitting the hydrogen concentration in the atmosphere to be more uniform throughout the different zones, tin condensation can be greatly reduced and other chemical interactions that may contribute to defect creation can also be reduced or avoided.

We have also surprisingly found that this injection of inert gas near or at the first zone/second zone interface can be provided without any type of detriment or significant detriment to tin bath composition. The impurity levels within the tin bath can be maintained with the inert second process gas injection so that bottom defects are not created at a higher rate and so that the tin bath composition can be maintained within a desired level of impurity content. A build-up of oxygen and formation of tin condensate and tin oxides (e.g. $Sn_yO_x$ such as, for example, $SnO$, $SnO_2$, etc.) can be avoided or at least not made worse via the injection of the inert second process gas (e.g. oxygen from air passing into the atmosphere due to imperfect seals and other constraints, oxygen diffusion into the bath via oxygen that may remain in the glass matrix material of the ribbon 2, etc.). By avoiding or mitigating against formation of tin condensate and formation of solid tin oxide ($Sn_yO_x$) particulate material that can contribute to surface defects can be avoided.

In some embodiments, the inert gas and/or first process gas can also include argon (Ar). The inclusion of argon may permit a more inert level of argon to be positioned closer to the ribbon adjacent to the tin bath 6 because the argon is heavier than nitrogen or hydrogen. It is contemplated that the argon may be able to provide a protective inert barrier around the periphery of the ribbon 2 to help further mitigate against formation of surface defects. For example, the argon can be a heavier gas that can collect closer to the ribbon 2 and help prevent formation of $SnO_2$ near the ribbon 2 so that such particulate materials can be prevented from contacting the ribbon or interacting with the ribbon to form defects.

We have also determined that embodiments of our control system and apparatus 1 can utilize additional features and control schemes to help further mitigate against surface defect formation during glass manufacturing. For example, the particulate concentration within the atmosphere ATM can be detected and/or monitored by one or more sensors S and the controller CTRL can be configured to adjust a mixture of hydrogen within the nitrogen of the first process gas for injection into different zones of the tin bath furnace 4 in response to the detected particulates. For example, the concentration of hydrogen within the first process gas and/or third process gas injected into the atmosphere ATM of the tin bath furnace 4 can be decreased in response to a detected concentration of particulates within the atmosphere ATM being at or above a pre-selected high particulate threshold. As another example, the concentration of hydrogen within the first process gas and/or third process gas injected into the atmosphere ATM of the tin bath furnace 4 can be increased in response to the particulate concentration being at or below a pre-selected low particulate threshold.

Each collection device CD can utilize at least one filter cloth, mesh, or other particulate filtration device that can separate particulates from the extracted gas to remove the particulates from the gas. The extracted gas can then be vented via a vent conduit 2v or recycled back into the atmosphere via a recycle conduit connected to the collection device(s) CD that can output the recycled gas after it has been cleaned or filtered via at least one recycle flow path 2r.

The recycling or venting of the extracted process gas of the atmosphere can be determined based on a particulate concentration of the extracted gas. In the event that particulate concentration over a high particulate concentration threshold is detected from the extracted gas obtained via the extraction flow path 2p, this can indicate that there is a high concentration of hydrogen within the extracted gas. The gas may then be recycled if a higher concentration of hydrogen within the atmosphere is desired or vented if the hydrogen concentration is at a desired level or at a high level. In the event that the detected particulate concentration is over a low particulate concentration threshold that is detected from the extracted gas obtained via the extraction flow path 2p, this can indicate that there is a low concentration of hydrogen within the extracted gas. The gas may then be recycled if a lower concentration of hydrogen within the atmosphere ATM is desired or vented if the hydrogen concentration is at a desired level or at a low level.

The number of collection devices, extraction conduits and recycle conduits for extraction flow paths 2p and recycle flow paths 2r can be adapted to meet a pre-selected set of design criteria. It is contemplated that each zone may have one or more extraction flow paths 2p and/or recycle flow paths 2r to facilitate recycling and extraction at different zones as may be desired. There may also be multiple vent conduits or a single common vent conduit arrangement for venting the extracted gas.

In some arrangements, the extraction system 8 can be configured to facilitate extraction flow paths 2p by use of central injections of an inert gas in a center region aligned with a center of the ribbon 2 while a process gas including a mixture of hydrogen and nitrogen can be injected near the sidewalls SW at a lower flow rate as compared to the injected inert gas (e.g. nitrogen or nitrogen mixed with argon). This type of process gas injection can facilitate the formation of extraction flow paths 2p that can help create an internal gas flow path within the atmosphere ATM to facilitate the extraction flow path being near the ribbon 2 and/or top surface of the tin bath 6.

Embodiments can also (or alternatively) include control elements for the heat elements HE to facilitate a reduction in surface defects. For example, the roof mounted heating elements HE (e.g. roof-mounted candle heaters, etc.) can be positioned to operate at multiple power levels ranging from a highest power level to provide a maximum amount of heating and a lowest power level to provide a minimum amount of heating as well as intermediate levels between the highest and lowest positions. The power level at heating elements HE for different zones can be adjusted or activated. For example, if a low level of tin condensate is detected via one or more sensors, heating elements HE can be adjusted to be increased in power to provide additional heating while other heating elements in locations detected to have a higher level of tin condensate is adjusted to be deactivated or operate at a lower heating level to provide decreased heating to reduce formation of tin condensate in those locations. This type of power adjustment for the heating elements HE can be provided so that the overall heating input provided by all the heating elements HE is cumulatively at a desired pre-selected heating level or within a pre-selected heating input range for glass manufacturing so that localized adjustment to minimize tin condensate can be provided while the overall heating input provided by the heating elements HE is still within a desired heating range or heating input level.

Also (or alternatively), the controller CTRL, operator device OPD and/or host device HD can be configured so that the tin bath furnace 4 operations are adapted so that one or more purging flows of process gas can also be injected to flow along the heating elements to help remove condensate to clean the heating elements. This can be actuated during manufacture of lower quality glass so that the increase in defects that may occur from such purging can be accommodated without detrimentally affecting the overall suitability of the formed glass so that the heating elements can be cleaner and contribute to a lower level of surface defect formation during high quality glass manufacturing cycles.

Embodiments can also (or alternatively) be adapted so the local controller CTRL, operator device OPD and/or host device HD can be configured so the locations at which the first process gas having a mixture of hydrogen and nitrogen are injected are more sideward relative to a center of the ribbon to define injected first and/or third process gas flows that facilitate the transport of defect causing agents (e.g. SnO, $SnO_2$, water, etc.) that may be formed from the hydrogen reacting with the tin and/or oxygen that may be present within the tin bath to the side wall regions of the tin bath furnace. By facilitating formation of such defect agents near the sidewalls SW, it is contemplated that tin condensate and other undesirable byproducts from undesired actions that may occur in the atmosphere ATM can be having a higher concentration at the side regions away from the peripheral edges of the ribbon 2 to avoid contact with the ribbon 2 and formation of any defects thereon. Such sideward concentration of the defect agents may also help prevent tin condensate from forming on the heating elements HE in some configurations as well.

Embodiments can also (or alternatively) be adapted so the local controller CTRL, operator device OPD and/or host device HD can be configured so the amount of hydrogen injected into the atmosphere ATM via the process gas injections is based on aa desired glass thickness. In some embodiments, the relationship between hydrogen injection and glass thickness can be a linearly correlated control parameter. Such control can also adjust process gas injection flow rates for different zones of the tin bath furnace as well as the hydrogen concentration uses in the injected process gas.

For example, the injection of process gas in the first zone Z1 where the ribbon that is formed may be at its widest width can be lower as compared to the hydrogen concentration and/or flow rate of downstream process gas injections (e.g. in the third zone Z3). For example, the injection of process gas having hydrogen mixed therein can be at a higher flow rate and/or higher hydrogen concentration in the third zone Z3 as compared to the first zone Z1 for thick ribbons that exceed a pre-selected thickness threshold. Such an adjustment can be provided to avoid tin condensate formation and other defect contributing agent formations in the first zone Z1 while also functioning to help decrease the formation of such condensate, particulate formation or other defect conditions in the colder third zone Z3 in which the ribbon undergoes cooling.

As another example, the flow rate and/or hydrogen concentration of the process gas can be adjusted based on the desired thickness of the ribbon 2. For a ribbon 2 that is to be thicker, a higher concentration of hydrogen can be used and/or a higher flow rate of the process gas having hydrogen may be injected into the first zone. For a ribbon 2 that is to have a lower thickness, a lower concentration of hydrogen can be used and/or a lower flow rate of the process gas having hydrogen may be injected.

Data from the sensor(s) S can also be provided to trigger locally controlled hydrogen injection into different zones of the tin bath furnace 4. For example, a determined difference between a tin-oxygen measurement from a sensor S and a pre-defined maximum tin-oxygen saturation level that can be calculated from a temperature of the tin bath detectable by another sensor S can be utilized for increasing and/or decreasing process gas in different zones. A decrease in the difference between the tin-oxygen measurement from a sensor S and a pre-defined maximum tin-oxygen saturation level that can be calculated from a temperature of the tin bath can be utilized to trigger an increase in hydrogen concentration within the injected process gas and/or an increase in the flow rate of the injected first process gas and/or third process gas that include hydrogen to be injected into the atmosphere ATM of the tin bath furnace 4. An increase in the difference between the tin-oxygen measurement from a sensor S and a pre-defined maximum tin-oxygen saturation level that can be calculated from a temperature of the tin bath can be utilized to trigger a decrease in hydrogen concentration within the injected process gas and/or a decrease in the flow rate of the injected first process gas and/or third process gas that include hydrogen to be injected into the atmosphere ATM of the tin bath furnace 4. This type of monitoring and adjustment can help provide a more uniform hydrogen content within the atmosphere ATM throughout the entirety of the different zones of the tin bath furnace 4 and can be performed in conjunction with the above discussed inert gas injection processing as well.

The processing and control that may be provided via the local controller CTRL and/or operator device OPD can be further augmented by a host device HD that can be configured to provide suggested changes to operational parameters for use by the operator and/or local controller CTRL. For example, sensor data and glass quality metric data can be communicated from the local controller CTRL, operator device OPD and/or sensors S of the tin bath furnace to the host device HD. The host device can utilize a machine learning application or other control processing program to update control modeling based on that received empirical furnace performance data and glass quality data to update control parameter values for the tin bath furnace operation. The updated control parameters can then be communicated to an operator via a communication between the host device HD and the operator device OPD to facilitate the communication of at least one suggested process control parameter change to be implemented by the operator. The operator may then utilize the operator device OPD to provide input via an input device (Input) to adjust one or more process parameters based on the suggestions. The adjusted process parameters may then be communicated to the local controller CTRL or be utilized by the operator device OPD in situations where the operator device is the local controller CTRL as well and directly performs control operations with the different elements of the tin bath furnace 4.

In some embodiments, the host device HD can have a pre-defined model control program (App) stored thereon that is run with the new data received to further update the control parameter values. A machine learning component of the program or other machine learning program (App) can be configured to process the received data so that high quality data is considered and data that may be of low quality can be ignored. For example, the received data can be analyzed and if it is determined that the data related to atypical processing (e.g. tin bath maintenance issue existed or other atypical processing problem was being addressed during processing), the data may be omitted or given a lower weight when processing that data to determine whether one or more updated control parameters should be suggested to an operator device OPD and/or local controller CTRL.

Data that may be provided to the host device HD via sensors S and/or local controller CTRL and/or the operator device OPD can include lehr speed, roller speed data, tin bath temperature data from different regions of the tin bath, dew point data from different regions of the tin bath furnace 4, glass thickness, ambient temperature, ambient dew point, run time for the glass of a certain thickness being made, width of the ribbon, oxygen concentration of the tin bath and/or oxygen concentration within the atmosphere ATM and hydrogen concentrations detected in different regions of the tin bath furnace. Additional data can include process gas injection rates, and nitrogen, hydrogen and/or argon concentrations within the injected process gas as well as the locations at which the process gas is injected. Other data may also be provided to the host device for utilization in updating model control parameters to account for empirical performance of the tin bath furnace 4 that can be obtained from the data the host device receives.

The host device HD can be configured to determine changes to control parameters for hydrogen, nitrogen, and/or argon flow rates and/or concentrations for inclusion in process gas injections to be made into the tin bath furnace 4 based on a number of different data received from sensors S and/or other criteria or data. The control parameters that can be determined for changing can include a) a concentration of hydrogen and/or nitrogen to include in a first process gas having nitrogen and/or argon for injecting into a first zone of a tin bath furnace, (b) a flow rate of the first process gas for injecting into the first zone, and/or (c) atmospheric pressure of the atmosphere in the tin bath furnace in the first zone. The control parameters to be determined for changing can also include (d) a concentration of hydrogen and/or nitrogen to include in a third process gas having nitrogen and/or argon for injecting into a second zone and/or third zone of the tin bath furnace, (e) a flow rate of the third process gas for injecting into the second zone and/or third zone, and/or (f) atmospheric pressure of the atmosphere in the tin bath furnace in the third zone. The control parameters to be determined for changing can also include atmospheric pressure adjacent an interface between the first zone Z1 and the second zone Z2 and/or a flow rate for injecting the second process gas comprising argon and/or nitrogen adjacent the interface of the first zone Z1 and the second zone Z2 so that hydrogen is not added into an atmosphere of the tin bath furnace via the injecting of the second process gas to facilitate maintenance of a pre-selected hydrogen content within the atmosphere ATM throughout the tin bath furnace during formation of glass from the ribbon 2. For instance, (i) thickness of the ribbon to be formed on the tin bath, (ii) atmospheric conditions within the tin bath furnace (e.g.

atmospheric pressure, concentrations of gases within the atmosphere, and/or flow rates of hydrogen and/or inert gas), (iii) ribbon speed, (iv) ribbon width, (v) tin conditions in the tin bath furnace, and/or (vi) measured defects of the ribbon can be utilized in determining set points or adjustments to set points to be made for one or more control parameters. In some embodiments, all of items (i) through (vi) can be utilized. In other embodiments, only one of items (i) through (vi) can be utilized. In yet other embodiments, a combination of items (i) through (vi) can be utilized (e.g. two or more of items (i) through (vi) can be utilized, three or more of these items can be utilized, four or more of these items can be utilized, or five or more of these items can be utilized).

Examples to help further illustrate exemplary processing and adjustment of one or more control parameters are provided below to help further illustrate adjustments that can be provided for reduction of surface defects. For example, tin bath furnace processing can be performed such that an adjustment in the thickness of a ribbon 2 is to occur so that the thickness of the ribbon 2 that is to be formed is changed for making glass of a different thickness and/or width during operation of a tin bath furnace. For instance, the thickness of the ribbon 2 may be adjusted to be reduced by 0.3 mm to transition to a new glass thickness for manufacturing of a different sized glass product. Based on an evaluation of empirical data, the host device HD can determine that top surface defects are more likely to occur in such a transitional change and, consequently, suggest an overall set point change for hydrogen concentration within the atmosphere ATM. The set points for hydrogen concentration may change as a result of this change via an operator accepting such a suggested change via providing of input for making this change via the operator device OPD, which can communicate one or more control parameter changes to the controller CTRL based on the input received from the operator.

For example, the hydrogen concentration overall for the entire atmosphere over the tin bath can be 0.5 vol % lower to account for this new thickness. This adjustment can be provided by adjusting a flow rate of nitrogen and/or argon into the tin bath furnace and/or adjusting a flow rate of hydrogen into the tin bath furnace. For example, the flow rate of nitrogen can be increased and/or the flow rate of hydrogen can be decreased to adjust the overall hydrogen concentration within the atmosphere. Such an adjustment can be effected by increasing a flow rate of inert gas as the second process gas for injection at the second process gas injection P2 point and/or increasing a flow rate of nitrogen gas and/or argon gas injected at other injection points. The concentration of hydrogen within the first and third process gases being injected and/or flow rates of the first and second process gases can also be adjusted to reduce the hydrogen content within the tin bath atmosphere.

As another example, the thickness of the ribbon 2 may be adjusted to be increased by 0.3 mm to transition to a new glass thickness for manufacturing of a different sized glass product. Based on an evaluation of empirical data, the host device HD can determine that bottom surface defects are more likely to occur in such a transitional change and, consequently, suggest an overall set point change for hydrogen concentration within the atmosphere ATM. The set points for hydrogen concentration may change as a result of this change via an operator accepting such a suggested change via providing of input for making this change via the operator device OPD, which can communicate various set-point changes to the controller CTRL based on the input received from the operator.

For example, the hydrogen concentration overall for the entire atmosphere over the tin bath can be 0.5 vol % higher to account for this new thickness. This adjustment can be provided by adjusting a flow rate of nitrogen and/or argon into the tin bath furnace and/or adjusting a flow rate of hydrogen into the tin bath furnace. For example, the flow rate of nitrogen can be decreased and/or the flow rate of hydrogen can be increased to adjust the overall hydrogen concentration within the atmosphere. Such an adjustment can be implemented by decreasing a flow rate of inert gas as the second process gas for injection at the second process gas injection location point P2 and/or decreasing a flow rate of nitrogen gas and/or argon gas injected at other injection points. The concentration of hydrogen within the first and third process gases being injected and/or flow rates of the first and second process gases can also be adjusted to increase the hydrogen content within the tin bath atmosphere.

As yet another example, the host device HD can evaluate empirical data received from a tin bath furnace system and determine that top surface defects are exceeding a preselected quality threshold. The host device HD can determine that flow rates and/or concentrations of hydrogen, nitrogen, and/or argon can be adjusted for injection of process gas into different zones to reduce the top surface defect formation rate. For example, the host device HD can suggest that the setpoint for hydrogen concentration in the second zone and/or near the initial portion of the second zone that is closest to the first zone Z1 can be decreased by a pre-selected top surface defect reduction change amount (e.g. 0.5 vol % hydrogen gas, etc.) via a communication sent to the operator device OPD. The set points for hydrogen concentration for injection of process gas into the first zone and/or second zone may change as a result of this change via an operator accepting such a suggested change via providing of input for making this change via the operator device OPD, which can communicate one or more control parameter changes to the controller CTRL based on the input received from the operator. For example, such a change may be effected by an adjustment of the flow rate of inert gas provided at the second process gas injection P2 point to increase the flow rate of this gas and/or reduce the flow rate of hydrogen and/or increase the flow rate of nitrogen for the injection of process gas into the second zone Z2 downstream of the second process gas injection P2 point and/or first zone Z1.

As yet another example, the host device HD can evaluate empirical data received from a tin bath furnace system and determine that bottom surface defects are exceeding a preselected quality threshold. The host device HD can determine that flow rates and/or concentrations of hydrogen, nitrogen, and/or argon can be adjusted for injection of process gas into different zones to reduce the top surface defect formation rate. For example, the host device HD can suggest that the setpoint for hydrogen concentration in the second zone and/or near the initial portion of the second zone that is closest to the first zone Z1 can be increased by a pre-selected bottom surface defect reduction change amount (e.g. 0.5 vol % increase in concentration of hydrogen gas, etc.) via a communication sent to the operator device OPD. The set points for hydrogen concentration for injection of process gas into the first zone and/or second zone may change as a result of this adjustment via an operator accepting such a suggested change via providing of input for making this adjustment via the operator device OPD, which can communicate one or more control parameter changes to the controller CTRL based on the input received from the operator. For example, such a change may be effected by an adjustment of the flow rate of inert gas provided at the second process gas injection P2 point to decrease the flow rate of this gas and/or increase the flow rate of hydrogen and/or decrease the flow rate of nitrogen for the injection of process gas into the second zone Z2 downstream of the second process gas injection P2 point and/or first zone Z1.

It should be appreciated that the above examples can also include other types of adjustments. For example, instead of a hydrogen concentration setpoint adjustment, the suggested adjustments can include changes to hydrogen and nitrogen flow rate set points and/or partial pressure setpoints for the hydrogen and/or nitrogen. Other types of adjustments for different control parameters can also (or alternatively) be provided consistent with the above discussed examples.

The host device HD can also be configured to evaluate the overall defect formation rates for top and bottom defects and select and adjustment to reduce top surface or bottom surface defects as may be appropriate to provide a highest economic return for a reduction of such defects (e.g. bottom surface defects may be desired to be avoided as opposed to top surface defects or vice versa depending on glass quality metric data for the products to be made, etc.). The selected adjustment metrics can then be communicated to an operator via a communication sent to the operator device for the operator's consideration in adjusting tin bath furnace operational control parameters.

Figure 6:
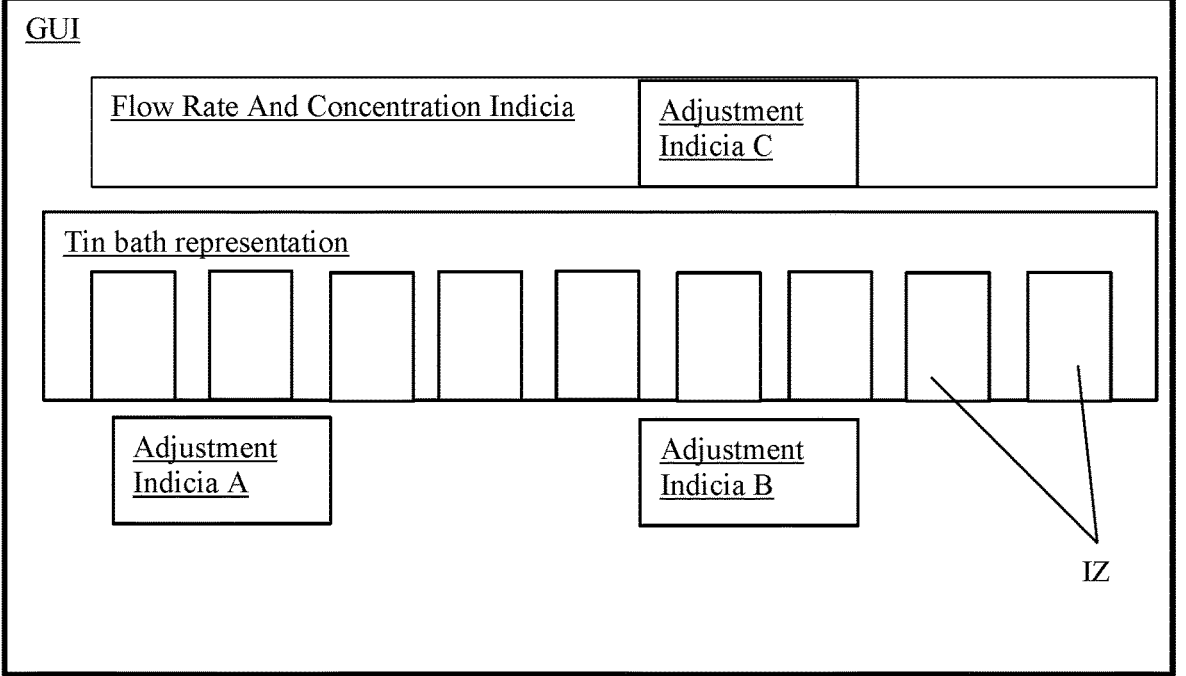
FIG. 6 is a schematic illustration of an exemplary graphical user interface (GUI) that illustrates an exemplary suggestion of control parameter adjustment that can be displayed via an operator device.

An example of the type of communication of a suggested change that can be provided via a communication exchanged between the host device HD and operator device OPD can be appreciated from FIG. 6. The exemplary GUI can also be a GUI for embodiments in which the operator device OPD can directly perform the evaluation of data and suggest changes that is based on data the operator device OPD receives from the sensors S and/or controller CTRL.

FIG. 6 illustrates a graphical user interface (GUI) that may be displayed via a display of an operator device OPD that is generated based on communication of data received from the host device HD or data the operator device receives from sensors S and/or the controller CTRL. The GUI can include flow rate and concentration indicia that can be illustrated to indicate hydrogen, nitrogen, and/or argon flow rates and/or flow rate setpoints for one or more zones or bays of a tin bath furnace. The GUI can also include a representation of the tin bath (a Tin bath representation), which can be a visual representation of the tin bath furnace that has indicia to identify the different zones (IZ) of the tin bath furnace. The visual representation can include coloration and/or other features to indicate different conditions of the tin bath or tin bath furnace atmosphere and can be configured to facilitate a display of other information or indicia via interactions with an operator using a pointer device or keyboard, stylus, or other type of input device.

The GUI can include suggested changes to different set points or other control parameters. This can be displayed via a communication the operator device OPD can receive from the host device HD as noted above, for example. Such adjustment suggestions can be provided via one or more adjustment indicia that can be illustrated in the GUI adjacent the tin bath representation and/or displayed flow rate and concentration indicia to help indicate a suggested change and/or indicate where a suggested change may be effected in the tin bath furnace if accepted.

The example of FIG. 6 illustrates first, second and third adjustment indicia as Adjustment Indicia A, Adjustment Indicia B and Adjustment Indicia C. More than three or less than 3 (e.g. just two or only one) adjustment indicia may alternatively be displayed based on data received from the host device HD. As can be appreciated from the above, the suggested changes provided by the host device HD can be based on the evaluation of empirical data and other data evaluation that is performed by the host device HD (examples of which are discussed above).

An operator can utilize the operator device OPD to provide input via a pointer device, keyboard, stylus, or other input device for interacting with the displayed GUI for accepting one or more of the suggested changes. Such a selection can trigger the operator device OPD communicating with the controller CTRL to adjust one or more control parameters so operations of the tin bath furnace is adjusted consistent with the changed control parameter(s).

It should be appreciated that the format and layout of the GUI can be configured in a number of different ways to convey relevant information to an operator and facilitate receipt of input from the operator. The type of representations to be displayed, indicia to be displayed, and/or the look and feel of such displayed indicia can be adapted to meet a particular set of design criteria. Also, the types of control parameters or other information that may be displayed via the GUI can also be defined to facilitate operator use and oversight in accordance with different sets of design criteria or operational criteria.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

It should be appreciated that modifications to the embodiments explicitly shown and discussed herein can be made to meet a particular set of design objectives or a particular set of design criteria. For instance, the arrangement of valves, piping, sensors, controller, communication connection elements (e.g. wiring, intermediate network nodes, network arrangement, etc.), furnace, and sensors, and other elements can be arranged, sized, and designed to meet a particular plant layout design that accounts for available area of the plant, a particular array of sensors, controller hardware, and furnace operational requirements and other design considerations. It should be appreciated that embodiments can be configured to include various process control elements positioned and configured to monitor and control operations (e.g. temperature sensors, pressure sensors, flow sensors, target element concentration sensors, an automated process control system having at least one work station that includes a processor, non-transitory memory and at least one transceiver for communications with the sensor elements, valves, and controllers for providing a user interface for an automated process control system that may be run at the work station and/or another computer device, etc.).

As another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of controllers that are configured to facilitate control of operations of tin bath float glass processing used to manufacture glass, glass manufacturing apparatuses, glass manufacturing control systems, and methods of making and using the same have been shown and described above, it is to be distinctly understood that the invention is not limited thereto but may be otherwise variously embodied and practiced within the scope of the following claims.

What is claimed is:

1. A process for controlling the manufacture of float glass on a tin bath, comprising:

determining one or more of: (a) a concentration of hydrogen and/or nitrogen to include in a first process gas having nitrogen and/or argon for injecting into a first zone of a tin bath furnace, (b) a flow rate of the first process gas for injecting into the first zone, and/or (c) atmospheric pressure of atmosphere in the tin bath furnace in the first zone based on one or more of (i) thickness of a ribbon to be formed on the tin bath, (ii) atmospheric conditions within the tin bath furnace, (iii) ribbon speed, (iv) ribbon width, (v) tin conditions in the tin bath furnace, and/or (vi) measured defects of the ribbon;

determining one or more of: (d) a concentration of hydrogen and/or nitrogen to include in a third process gas having nitrogen and/or argon for injecting into a second zone and/or a third zone of the tin bath furnace, (e) a flow rate of the third process gas for injecting into the second zone and/or third zone, and/or (f) atmospheric pressure of atmosphere in the tin bath furnace in the third zone based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon;

determining a flow rate for injecting a second process gas comprising argon and/or nitrogen adjacent an interface of the first zone and the second zone so that hydrogen is not added into an atmosphere of the tin bath furnace via the injecting of the second process gas to facilitate maintenance of a pre-selected hydrogen content within the atmosphere throughout the tin bath furnace during formation of glass from the ribbon; and adjusting a power level of one or more heating elements of the tin bath furnace based on detected tin condensate within the atmosphere and/or the heating elements;

wherein the first zone is a ribbon forming zone, the third zone is a cooling zone, and the second zone is a transition zone between the first zone and third zone.

2. The process of claim 1, comprising:

injecting the second process gas within the first zone adjacent the interface, within the second zone adjacent the interface, or at the interface.

3. The process of claim 2, comprising:

injecting the first process gas into the first zone; and injecting the third process gas into the second zone and/or the third zone downstream of a location at which the second process gas is injected.

4. The process of claim 1, comprising:

receiving, at a host device, glass manufacturing data for the tin bath furnace to update process modeling and updating the process modeling to determine whether one or more control parameters should be adjusted; and the host device communicating with a controller of the tin bath furnace or an operator device of the tin bath furnace to suggest adjustment of the one or more control parameters based on the updating of the process modeling.

5. The process of claim 1, wherein:

the determining of one or more of: (a) a concentration of hydrogen and/or nitrogen to include in a first process gas having nitrogen and/or argon for injecting into a first zone of a tin bath furnace, (b) a flow rate of the first process gas for injecting into the first zone, and/or (c) atmospheric pressure of the atmosphere in the tin bath furnace in the first zone based on one or more of (i) the thickness of a ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon; comprises:

determining the concentration of hydrogen to be included in the first process gas and the flow rate of the first process gas; and wherein the determining of one or more of: (d) a concentration of hydrogen and/or nitrogen to include in a third process gas having nitrogen and/or argon for injecting into a second zone and/or third zone of the tin bath furnace, (e) a flow rate of the third process gas for injecting into the second zone and/or third zone, and/or (f) atmospheric pressure of the atmosphere in the tin bath furnace in the third zone based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon comprises:

determining the concentration of hydrogen to be included in the third process gas and the flow rate of the third process gas.

6. The process of claim 1, comprising:

determining a pressure of atmosphere of the tin bath furnace adjacent the interface of the first zone and the second zone; and wherein the determining of the flow rate for injecting the second process gas adjacent the interface of the first zone and the second zone is based on one or more of (i) the thickness of the ribbon to be formed on the tin bath, (ii) the atmospheric conditions within the tin bath furnace, (iii) the ribbon speed, (iv) the ribbon width, (v) the tin conditions in the tin bath furnace, and/or (vi) the measured defects of the ribbon.

7. The process of claim 1, comprising:

in response to detection of a particulate material that exceeds a first threshold or meets a first threshold, venting gas extracted from the atmosphere; and in response to detection of a particulate material that is at or below a second threshold, recycling gas extracted from the atmosphere after particulate material entrained within the extracted gas is removed from the extracted gas.

8. The process of claim 1, wherein the adjusting of the power level is performed so that heating elements have increased power when the detected tin condensate is below a pre-selected low condensate threshold and heating elements have decreased power when the detected tin condensate is at or above a pre-selected high condensate threshold.

9. The process of claim 1, comprising:

determining that glass to be manufactured from the ribbon has a quality that is within a pre-selected low quality threshold; and passing a purge flow along heating elements mounted to a roof of the tin bath furnace while the glass to be manufactured from the ribbon has the quality that is within the pre-selected low quality threshold to remove tin condensate from the heating elements and/or clean the heating elements.

\* \* \* \* \*